(12) United States Patent
Zaharinov

(10) Patent No.: US 11,814,214 B2
(45) Date of Patent: Nov. 14, 2023

(54) COLLAPSIBLE ARTICLE COMPRISING COMBINATIONS AND MULTIPLICATIONS OF FOLDABLE SECTIONS

(71) Applicant: DIFOLD INC., Middletown, DE (US)

(72) Inventor: Petar Kirilov Zaharinov, Sofia (BG)

(73) Assignee: DIFOLD INC., Middletown, DE (US)

( * ) Notice: Subject to any disclaimer, the term of this patent is extended or adjusted under 35 U.S.C. 154(b) by 1096 days.

(21) Appl. No.: 15/968,077

(22) Filed: May 1, 2018

(65) Prior Publication Data

US 2018/0319538 A1 Nov. 8, 2018

Related U.S. Application Data

(60) Provisional application No. 62/500,534, filed on May 3, 2017.

(51) Int. Cl.
*B65D 21/08* (2006.01)
*B65H 45/12* (2006.01)
(Continued)

(52) U.S. Cl.
CPC ............ *B65D 21/086* (2013.01); *B29C 53/04* (2013.01); *B31B 50/00* (2017.08); *B31D 5/0086* (2013.01);
(Continued)

(58) Field of Classification Search
CPC ...... B65D 21/086; B65D 1/0292; B65D 1/02; B65D 1/08; B65D 5/36; B65D 11/186; B65D 51/06; B65D 85/14; B65D 88/52; B65D 88/522; B65D 88/525; B32B 1/02; B32B 1/08; E04B 1/19; E04B 1/34357; E04B 1/34373; E04C 3/005
(Continued)

(56) References Cited

U.S. PATENT DOCUMENTS 3,810,503 A * 5/1974 Lewis, Jr. ................. A61J 1/10
383/96
3,872,994 A * 3/1975 Hyde .................... B65D 11/20
220/907

(Continued)

FOREIGN PATENT DOCUMENTS

DE 3533561 * 4/1987 ............. B65D 37/00
JP 2003-128041 * 5/2003 ............... B65D 1/40
(Continued)

*Primary Examiner* — Michael C Romanowski
(74) *Attorney, Agent, or Firm* — MARSHALL, GERSTEIN & BORUN LLP

(57) ABSTRACT

A collapsible article comprising a plurality of foldably interconnected foldable sections/modules. The foldable sections can be part of cylindrical or conical surfaces. They can also be in the form of closing sections. When the foldable sections are part of tubular surfaces, either cylindrical or conical, they consist of four polygonal surface segments. The polygonal segments are curved/round in unfolded state and have a flat or approximately flat shape in partly folded and folded states. The folding process usually involves an abrupt transition between the unfolded and folded positions which makes the unfolded article almost as stable as non-foldable equivalents. The folding process usually requires application of force on the edges that form valley creases during folding.

6 Claims, 39 Drawing Sheets

(51) Int. Cl.
  *B65D 3/00*     (2006.01)
  *B29C 53/04*    (2006.01)
  *B31B 50/00*    (2017.01)
  *B31D 5/00*     (2017.01)
  *B32B 1/08*     (2006.01)
  *F16L 11/00*    (2006.01)
  *B31B 110/00*   (2017.01)
  *B31B 105/00*   (2017.01)
  *B31B 110/20*   (2017.01)
  *B29C 53/36*    (2006.01)
  *B29C 45/00*    (2006.01)
  *B29C 49/00*    (2006.01)
  *B65D 5/02*     (2006.01)
  *B31D 5/04*     (2017.01)
  *B31F 1/00*     (2006.01)
  *B32B 1/02*     (2006.01)

(52) U.S. Cl.
  CPC ............... *B32B 1/08* (2013.01); *B65D 3/00* (2013.01); *B65H 45/12* (2013.01); *B29C 45/0017* (2013.01); *B29C 49/00* (2013.01); *B29C 53/36* (2013.01); *B31B 2105/00* (2017.08); *B31B 2110/00* (2017.08); *B31B 2110/20* (2017.08); *B31D 5/04* (2013.01); *B31F 1/0009* (2013.01); *B32B 1/02* (2013.01); *B65D 5/02* (2013.01); *F16L 11/00* (2013.01)

(58) Field of Classification Search
  USPC ......... 229/108–116, 405, 106; 206/218, 577; 428/34.1–36.92; 220/6, 666; 138/119
  See application file for complete search history.

(56) References Cited

U.S. PATENT DOCUMENTS

| | | | | |
|---|---|---|---|---|
| 4,074,477 A * | 2/1978 | Runyon | ................ | E04B 1/32 52/646 |
| 4,359,842 A * | 11/1982 | Hooker | ................ | A63H 33/16 52/DIG. 10 |
| 4,792,086 A * | 12/1988 | Chen | ................ | A45F 3/20 229/117 |
| 5,234,727 A * | 8/1993 | Hoberman | ............ | A63H 33/16 428/542.2 |
| 5,597,112 A * | 1/1997 | Knapp | ................ | B65D 5/029 229/116 |
| 5,762,262 A * | 6/1998 | Martin | ................ | B65D 5/36 229/120.21 |
| 5,899,842 A * | 5/1999 | Di Pilla | ................ | B31D 5/04 493/405 |
| 5,921,048 A * | 7/1999 | Francom | ................ | E04C 5/07 242/445.1 |
| 6,054,194 A * | 4/2000 | Kane | ................ | B60D 5/003 428/181 |
| 6,149,025 A * | 11/2000 | Wang | ................ | B65D 37/00 220/9.3 |
| 6,233,880 B1 * | 5/2001 | Sogame | ................ | B64G 9/00 52/79.5 |
| 8,777,825 B1 * | 7/2014 | Kling | ................ | B65D 5/2038 493/162 |
| 8,820,005 B2 * | 9/2014 | Hovsepian | ............ | E04H 15/006 52/63 |
| 9,695,586 B1 * | 7/2017 | Reading | ................ | F16S 3/06 |
| 10,100,550 B2 * | 10/2018 | Chen | ................ | E04H 15/32 |
| 2005/0127074 A1 * | 6/2005 | Kusuma | ................ | B65D 21/086 220/6 |
| 2007/0056969 A1 * | 3/2007 | Wang | ................ | B65D 37/00 220/9.4 |
| 2009/0114710 A1 * | 5/2009 | Lang | ................ | B65D 3/20 229/404 |
| 2011/0095076 A1 * | 4/2011 | Knighton | ............ | B65D 5/3621 229/185 |
| 2013/0277364 A1 * | 10/2013 | Kusuma | ................ | A45F 3/20 220/8 |
| 2014/0166650 A1 * | 6/2014 | Kanfer | ............ | B05B 11/00414 220/6 |
| 2014/0340275 A1 * | 11/2014 | Georgakopoulos | ...... | H01Q 1/36 343/834 |
| 2016/0137334 A1 * | 5/2016 | Garland | ................ | B65D 5/10 229/113 |
| 2016/0144993 A1 * | 5/2016 | George | ................ | B65D 15/08 229/404 |
| 2017/0050800 A1 * | 2/2017 | Gain | ................ | B29B 11/08 |
| 2018/0072014 A1 * | 3/2018 | Dudte | ................ | B31D 5/04 |
| 2018/0205153 A1 * | 7/2018 | Georgakopoulos | .. | H01Q 11/086 |
| 2018/0278200 A1 * | 9/2018 | Jeon | ................ | H02S 30/20 |
| 2019/0381755 A1 * | 12/2019 | Tachi | ................ | B31D 5/0086 |

FOREIGN PATENT DOCUMENTS

| | | | | |
|---|---|---|---|---|
| JP | 3824540 | * | 9/2006 | ............. B65D 1/02 |
| JP | 2010-007801 | * | 1/2010 | ............. F16S 1/02 |

* cited by examiner

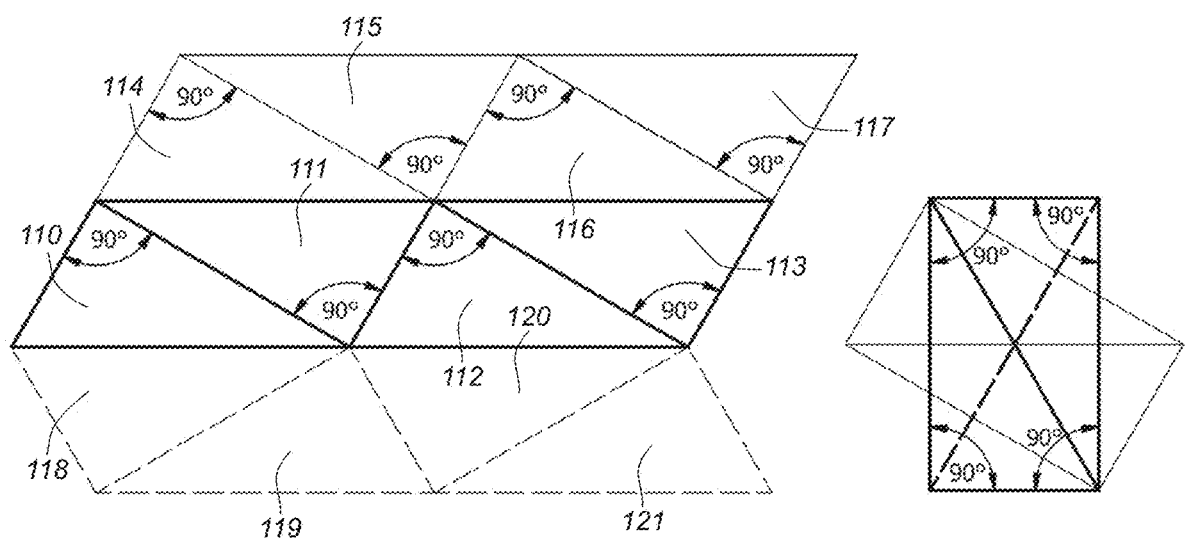
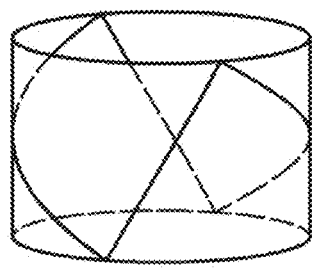
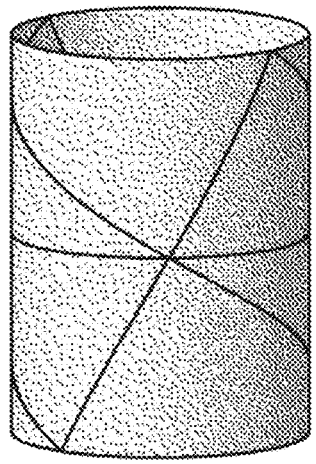
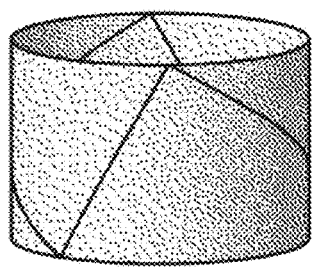
FIG. 3
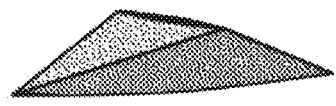
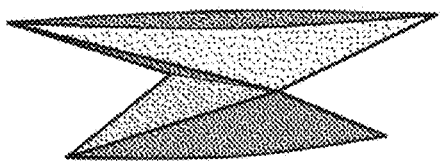
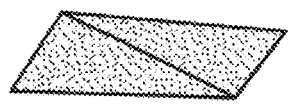
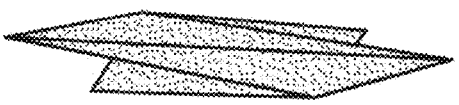

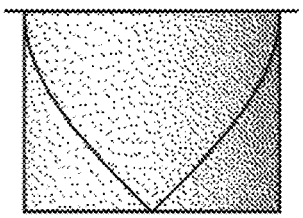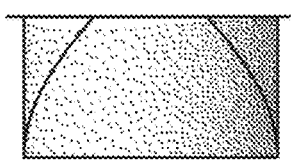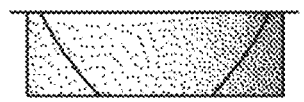
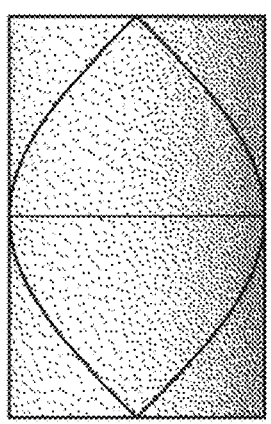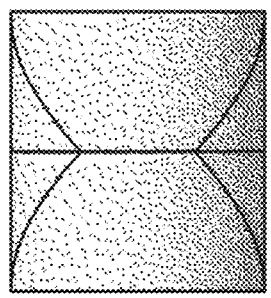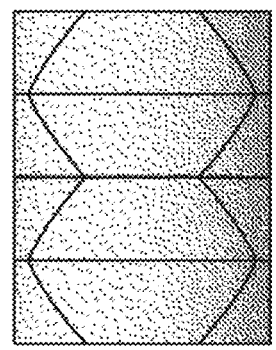
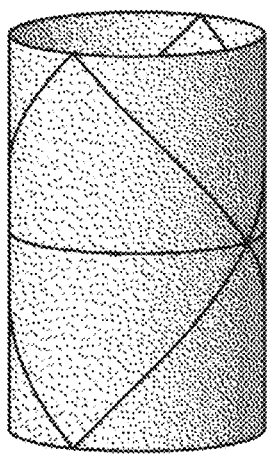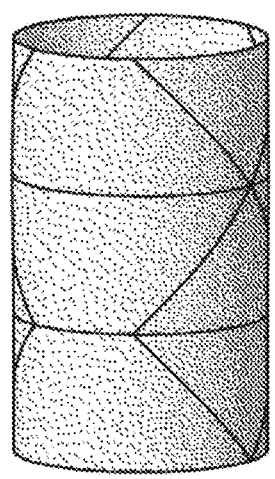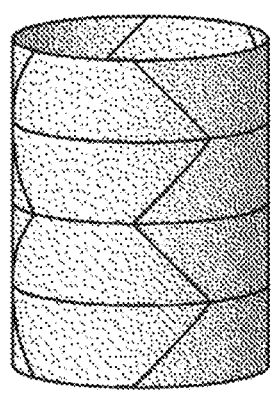
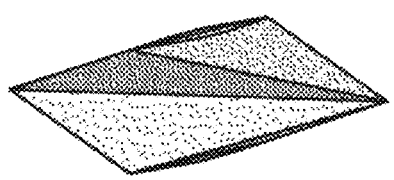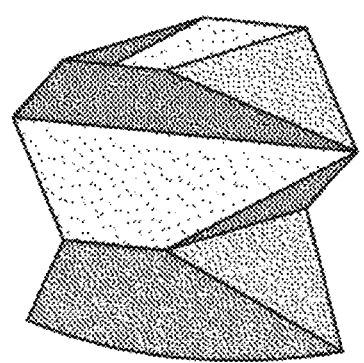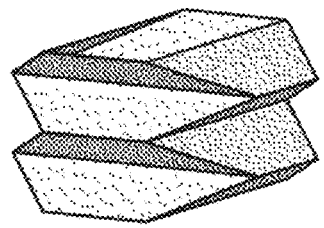

FIG. 8　　　　FIG. 9　　　　FIG. 10

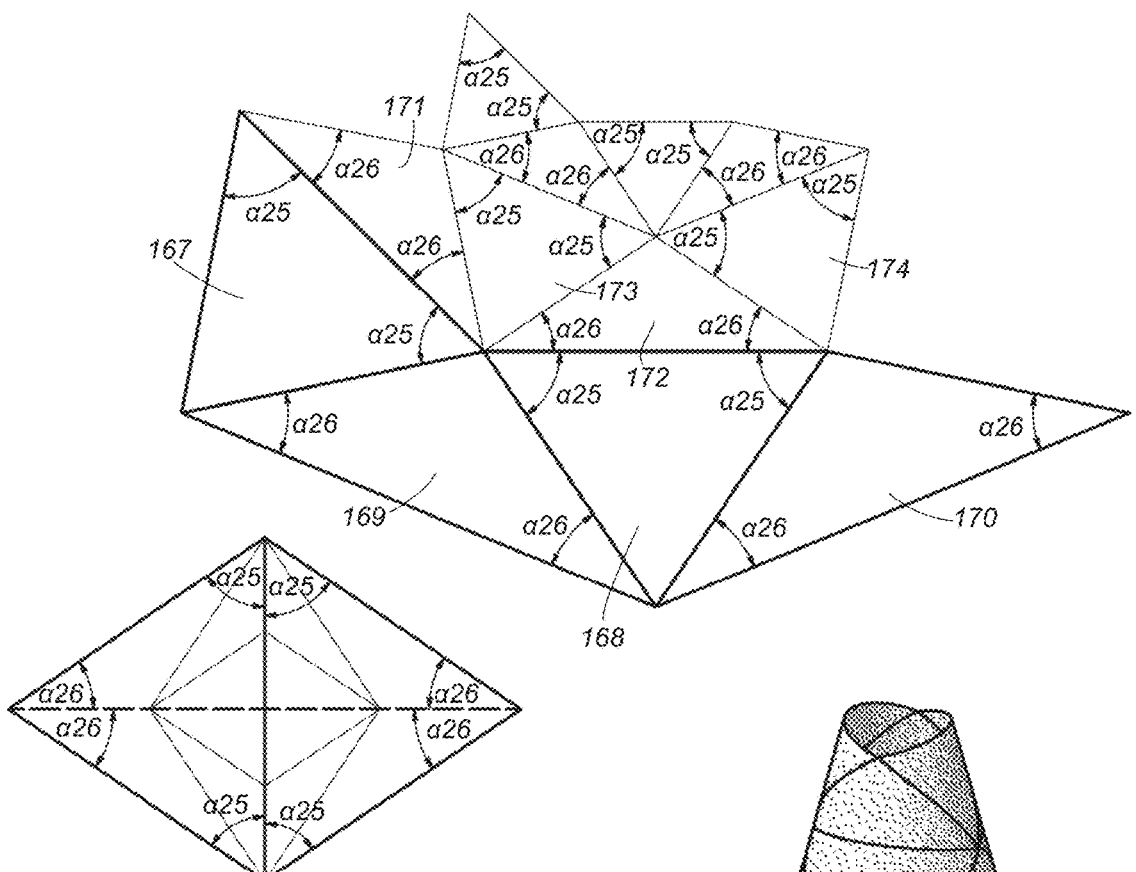
FIG. 11
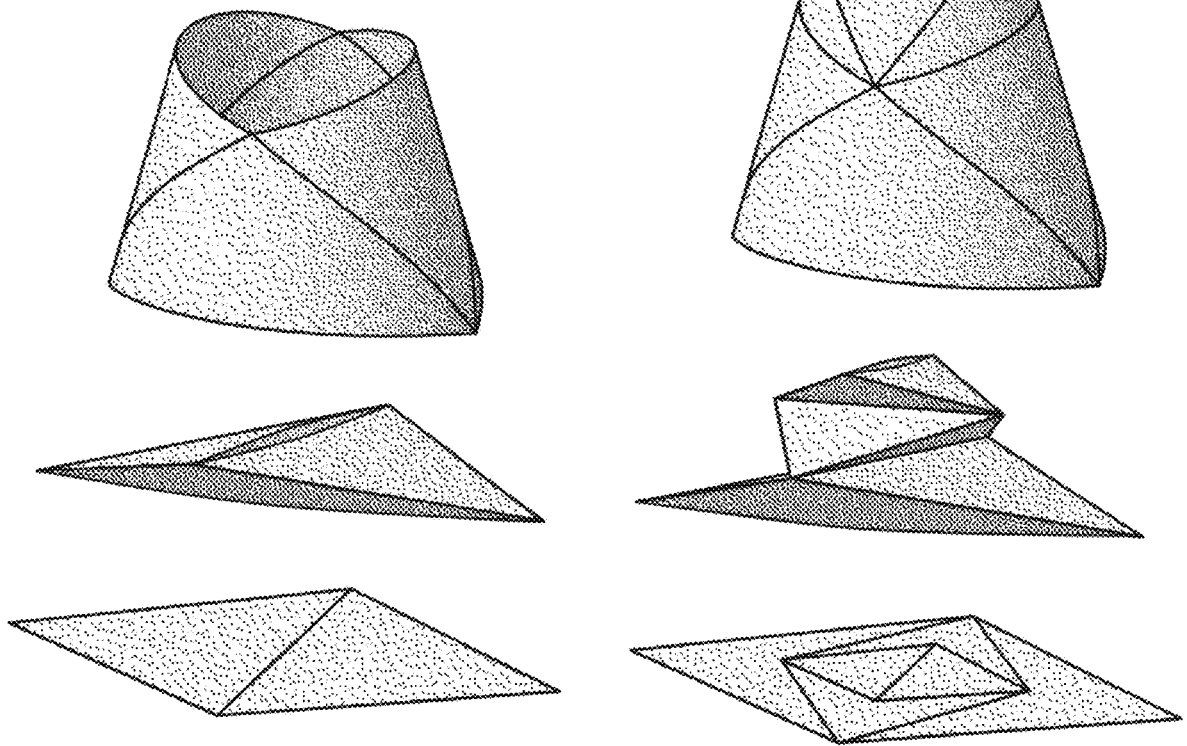

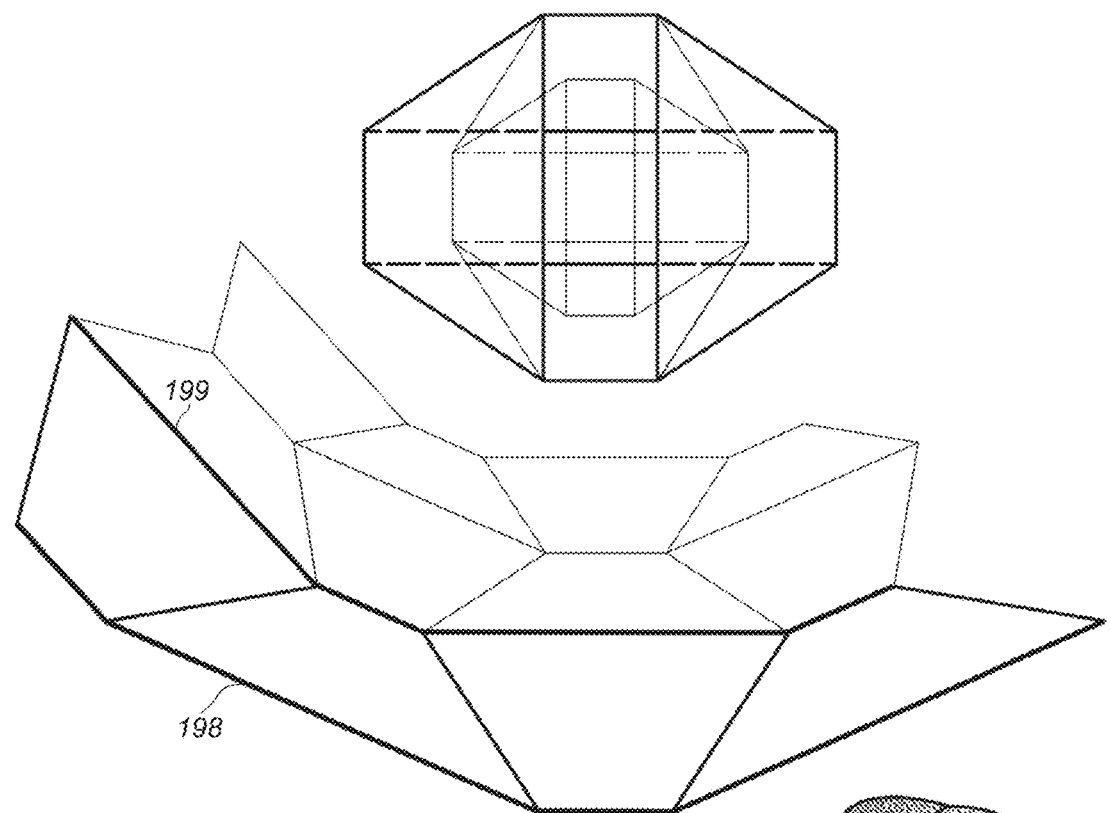
FIG. 15
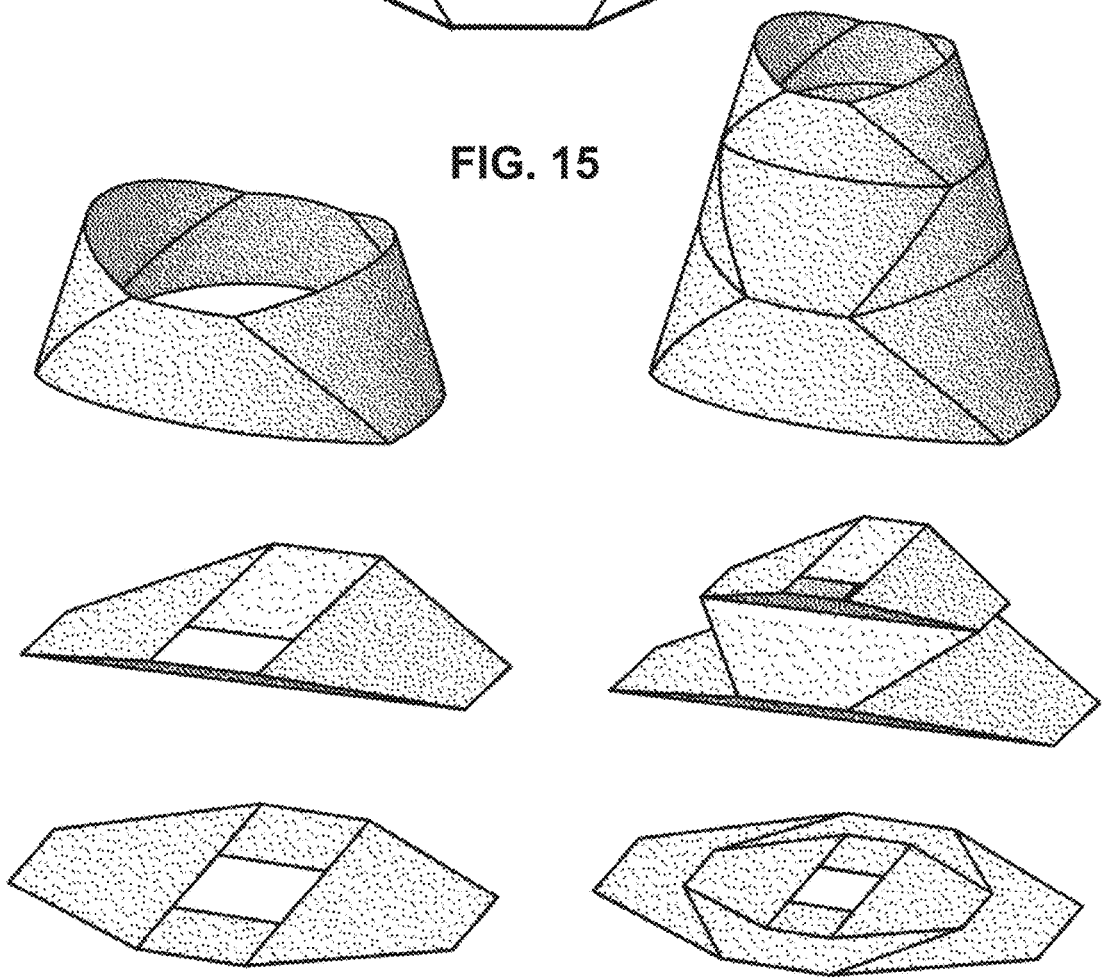

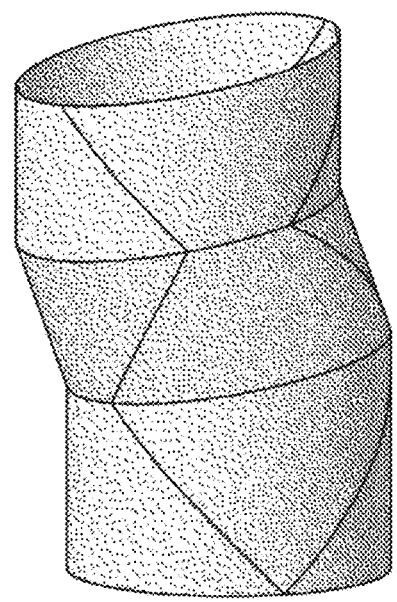 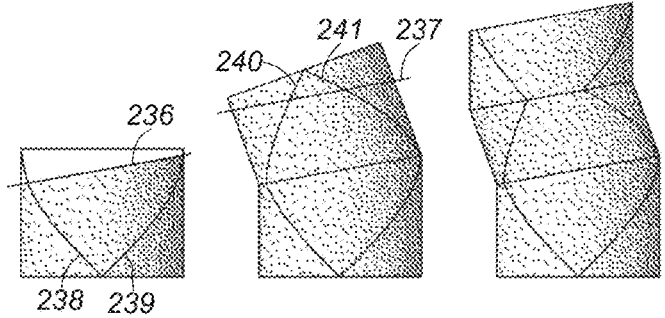 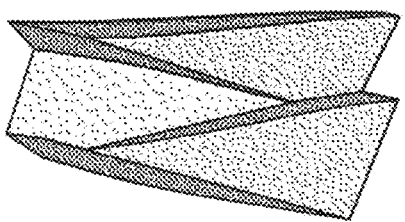
FIG. 21
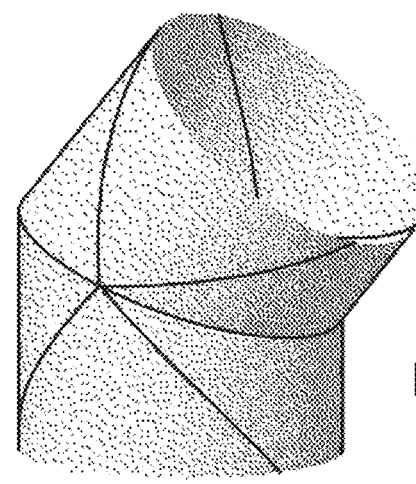 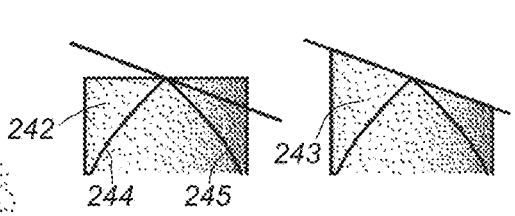 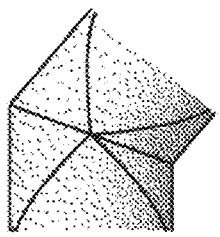
FIG. 22
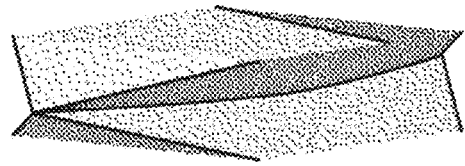
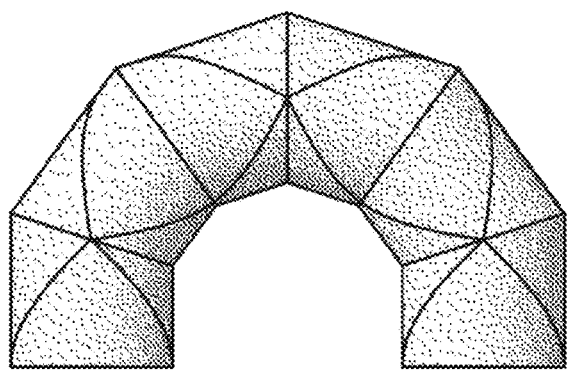

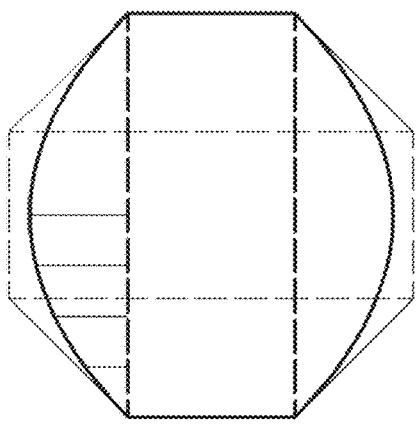
FIG. 27
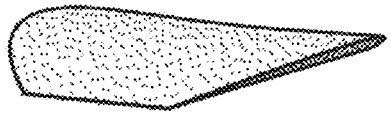
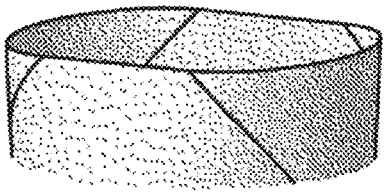
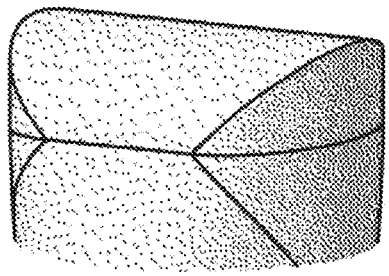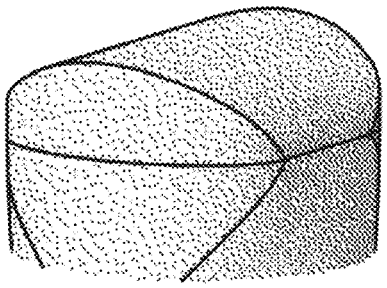
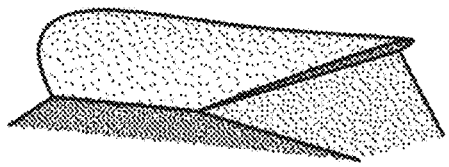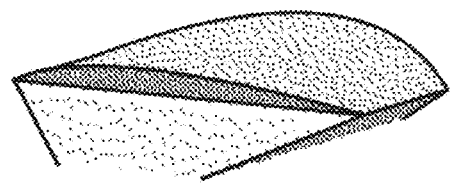
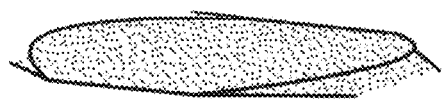

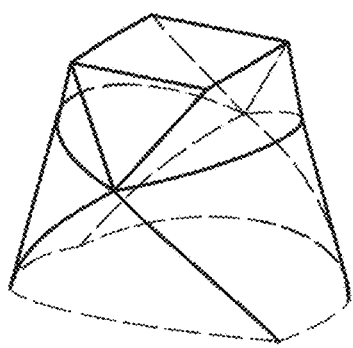
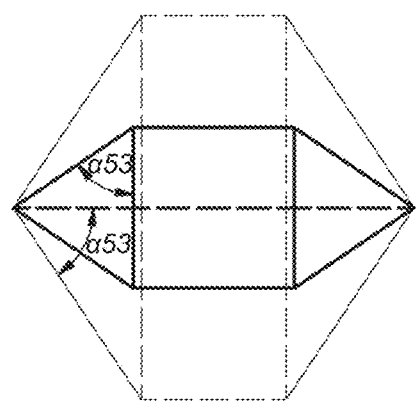
FIG. 31
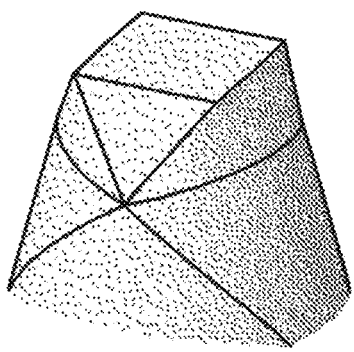
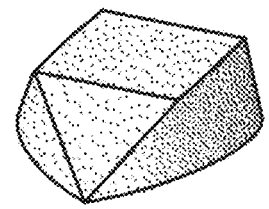
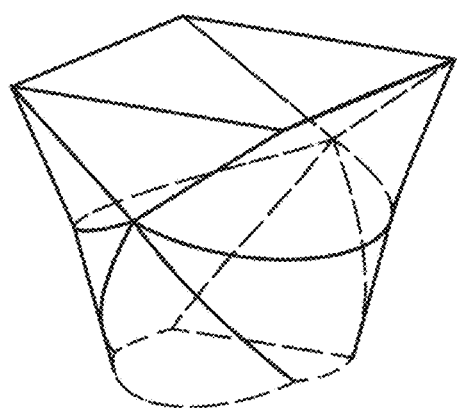
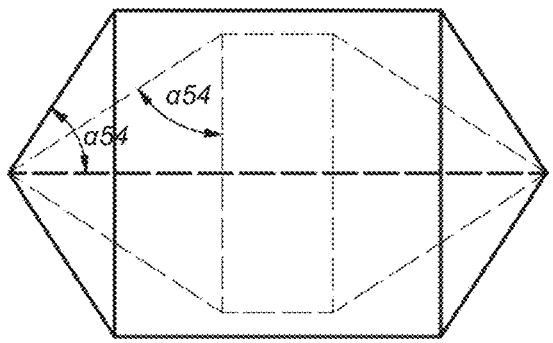
FIG. 32
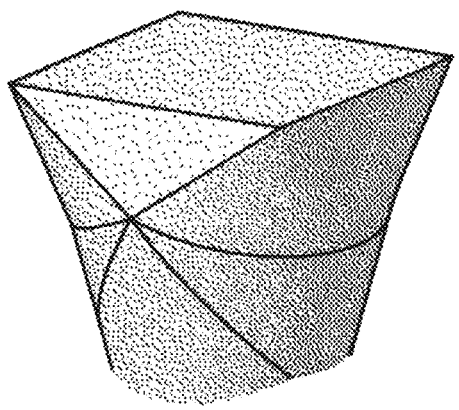
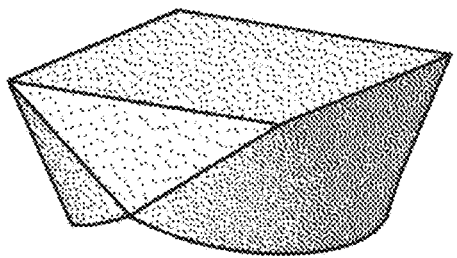

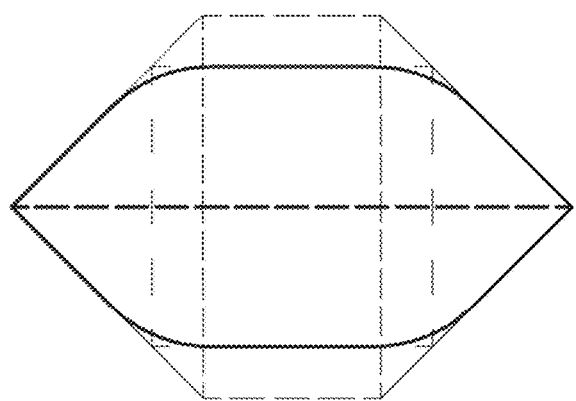
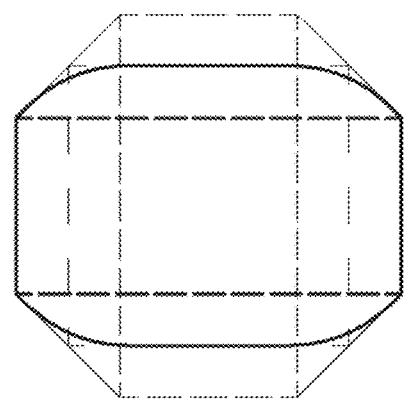
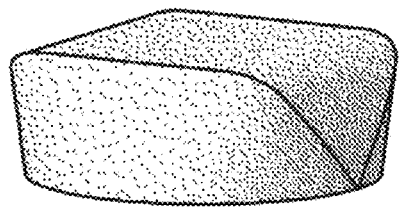
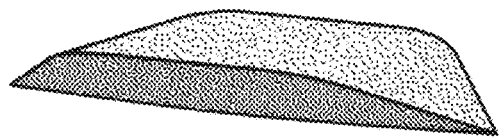
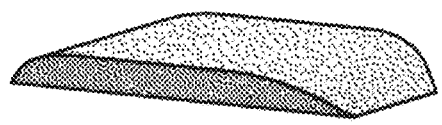
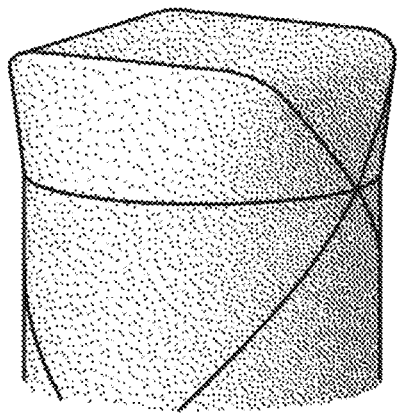
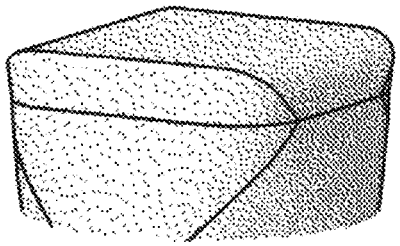
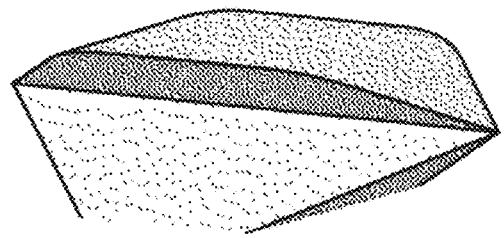
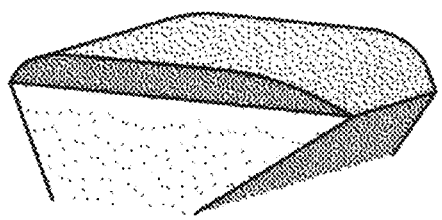
FIG. 36  FIG. 37

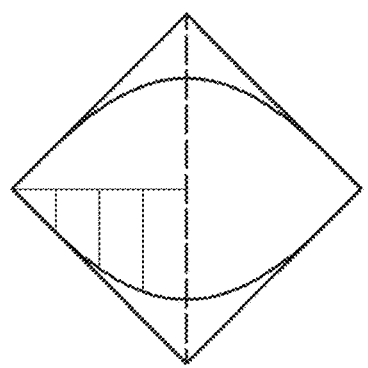
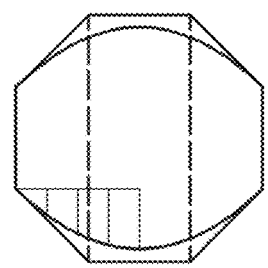
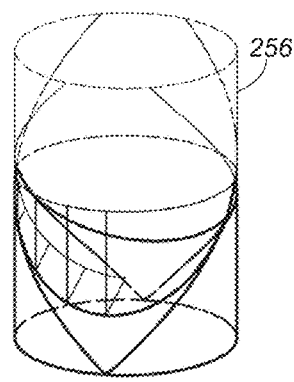
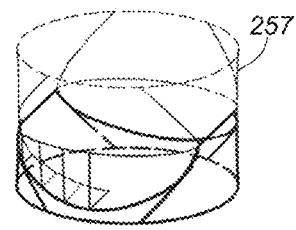
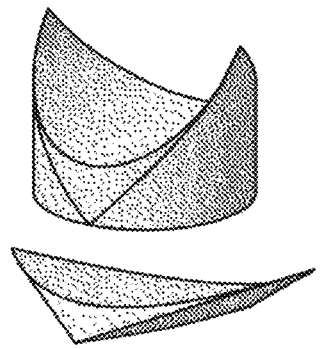
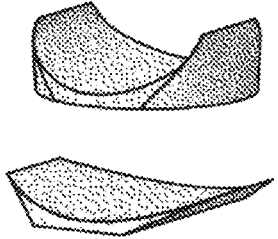
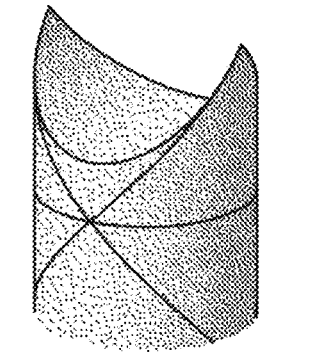
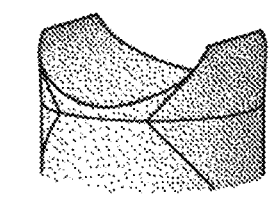
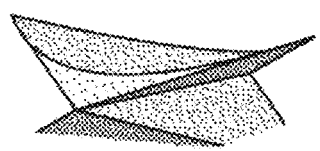
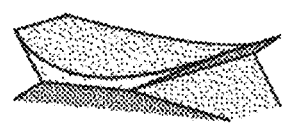
FIG. 42　　　　　FIG. 43

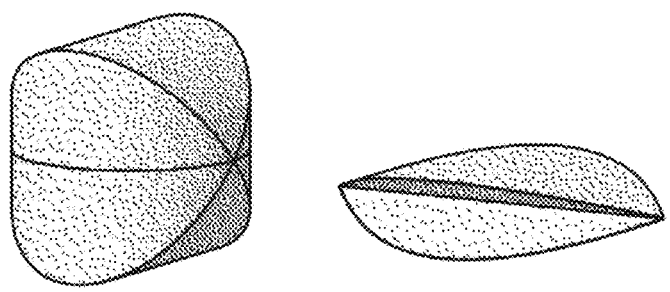
FIG. 44
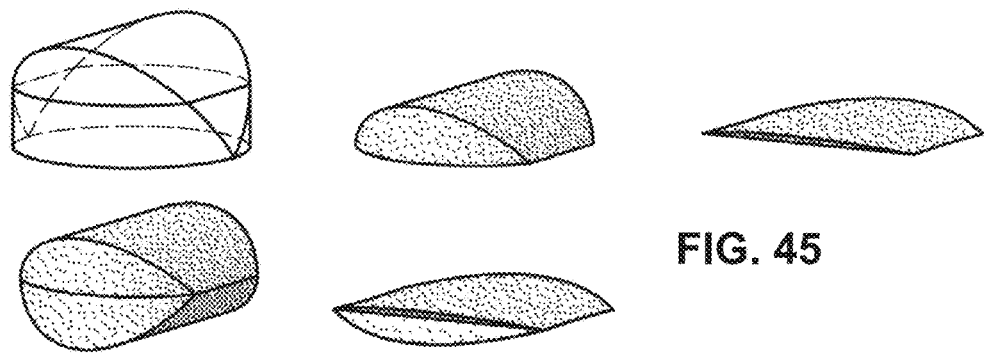
FIG. 45
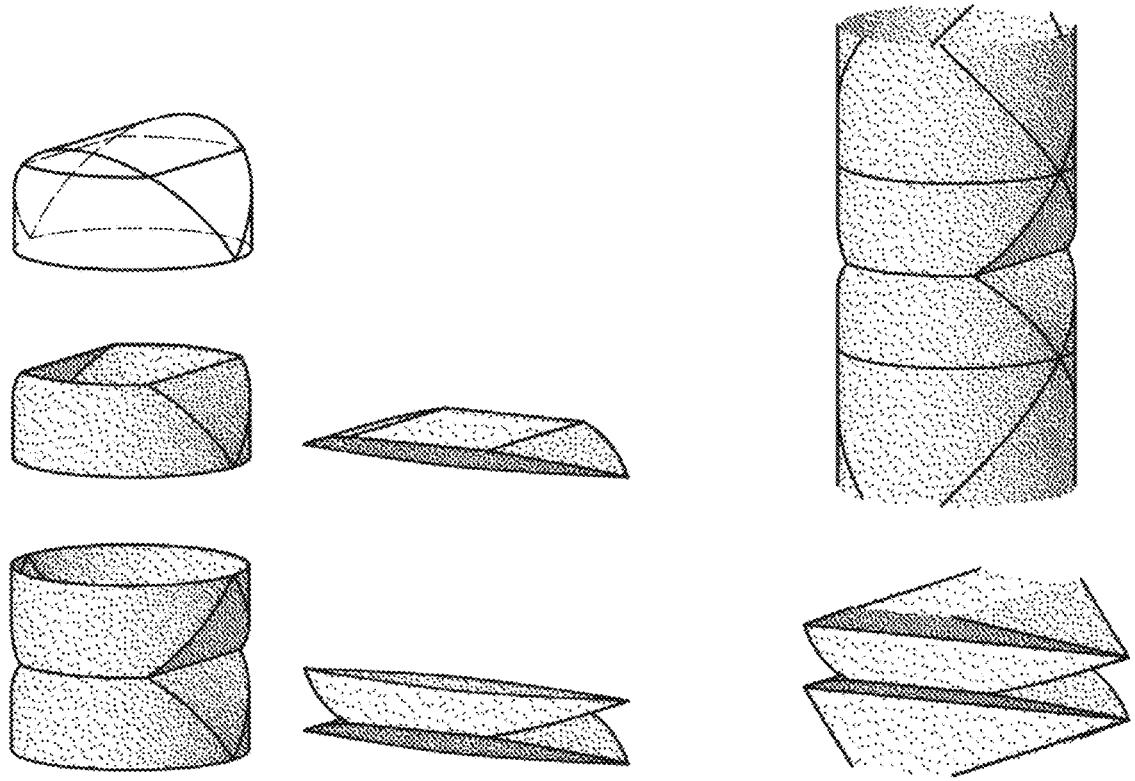
FIG. 46
FIG. 47

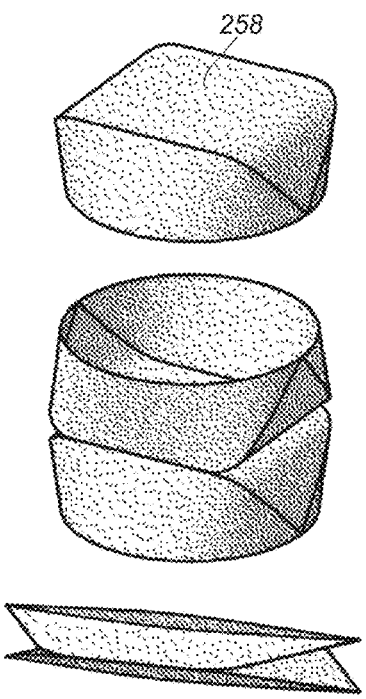
FIG. 48
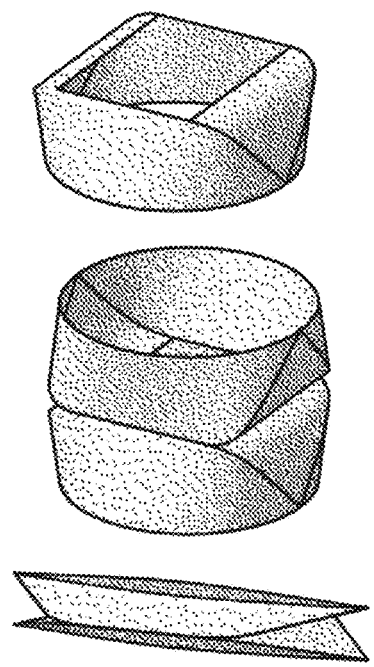
FIG. 49
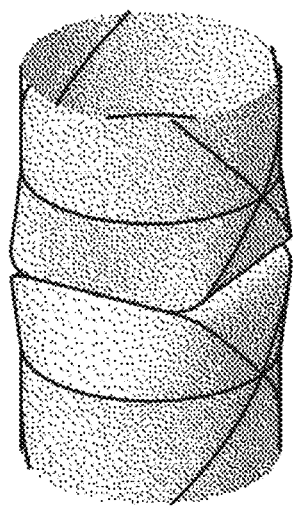
FIG. 50
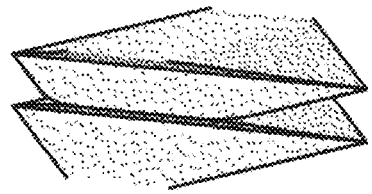
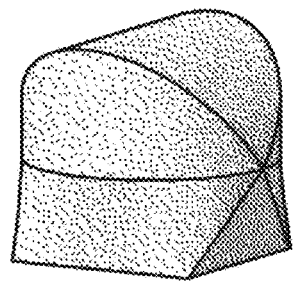
FIG. 51
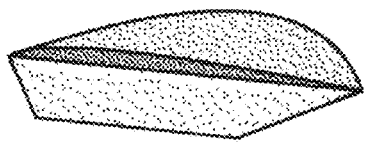

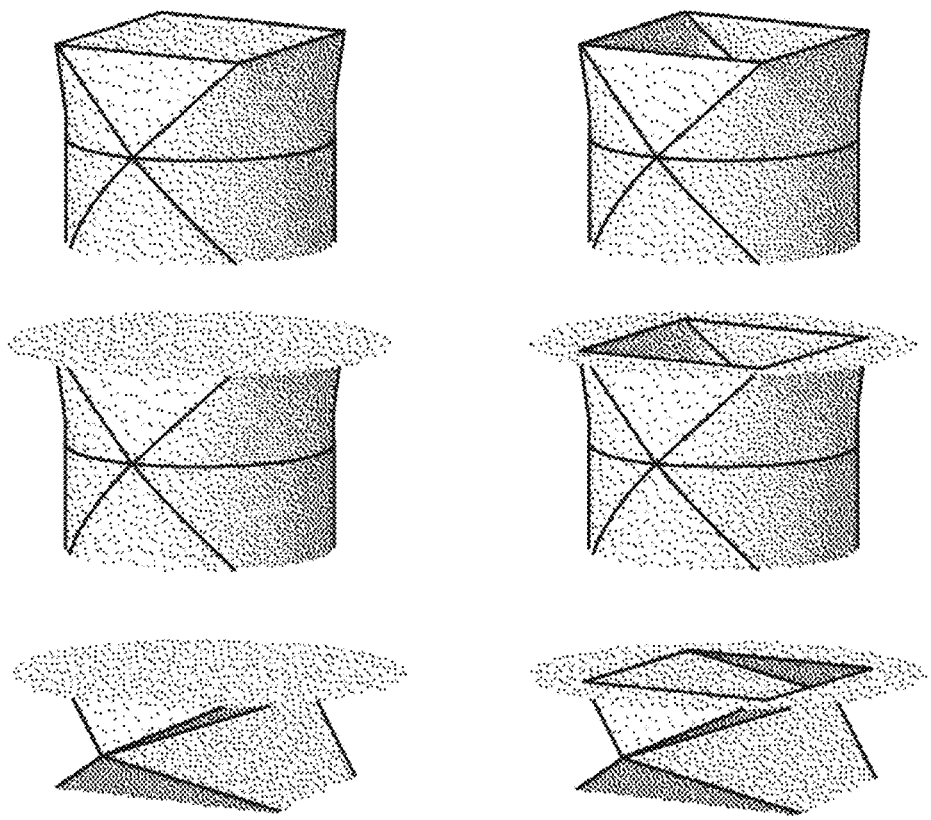
FIG. 54
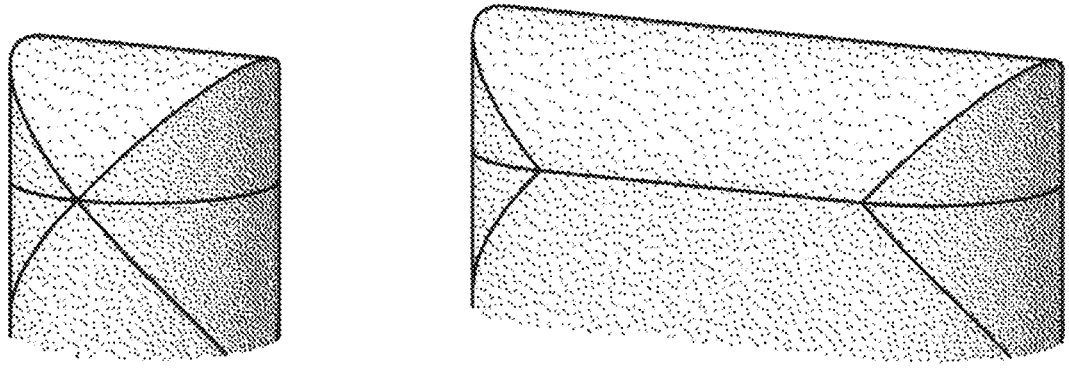
FIG. 55
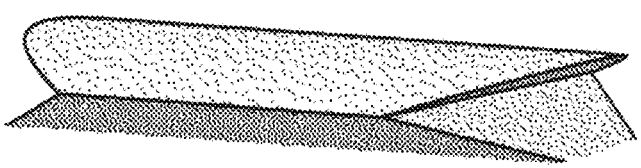

COLLAPSIBLE ARTICLE COMPRISING COMBINATIONS AND MULTIPLICATIONS OF FOLDABLE SECTIONS

CROSS-REFERENCE TO RELATED APPLICATIONS

The present application claims priority to U.S. Provisional Patent Application No. 62/500,534 (filed on May 3, 2017).

BACKGROUND

The main problems of currently known foldable tubular structures used for collapsible articles are that they are not very stable in unfolded position, they require to be made of very soft materials, they can not provide smooth cylindrical or conical surfaces.

The folding principles that are currently used do not offer universal solutions that can work with different material types and different production methods. They do not offer variability in shape and usually involve intensive corrugation of the surface that can make the cleaning and maintenance of the interior of such articles a difficult task.

SUMMARY

The disclosed structures of collapsible articles comprising a plurality of foldable sections can be both stable and compact. They can be made of different materials including harder ones and can be manufactured using different production methods. They can comprise both cylindrical and conical portions which gives much more freedom in shape compared to the widely used collapsible technologies. The articles can be both single use and reusable ones. The single use products can be easily collapsed and disposed more effectively and reduce significantly the waste volume. Collapsible reusable products based on the disclosed combinations and multiplications of foldable sections can be very practical by being very compact and fully functional at the same time.

BRIEF DESCRIPTION OF THE DRAWINGS

FIG. 3 depicts a simple collapsible unit made of four identical non-isosceles right-angled triangular segments.

FIG. 8 demonstrates foldable combinations of sections built by mirroring sections depicted in FIG. 2 and FIG. 3.

FIG. 9 shows foldable combinations of sections built by mirroring sections depicted in FIG. 4.

FIG. 10 shows foldable combinations of sections built by mirroring sections depicted in FIG. 5.

FIG. 11 demonstrates a simple and symmetrical section and its combination/multiplication composed of isosceles triangular segments.

FIG. 15 depicts a conical section and its combination/multiplication composed of trapezoid segments.

FIG. 21 shows trimming and mirroring of cylindrical or conical foldable sections and/or combinations between such sections.

FIG. 22 shows trimming and mirroring of extended cylindrical or conical foldable sections and/or combinations between such sections.

FIG. 27 shows a trimmed round collapsible closing section appropriate for cylindrical surfaces.

FIG. 31 depicts a very simple flat collapsible closing section appropriate for conical surfaces.

FIG. 32 depicts a very simple flat collapsible closing section appropriate for conical surfaces.

FIG. 36 depicts a very simple filleted flat collapsible closing section appropriate for cylindrical surfaces.

FIG. 37 depicts a trimmed and filleted flat collapsible closing section appropriate for cylindrical surfaces.

FIG. 42 shows a sharp collapsible closing section appropriate for cylindrical or conical surfaces.

FIG. 43 shows a trimmed sharp collapsible closing section appropriate for cylindrical or conical surfaces.

FIG. 44 depicts mirroring of closing sections appropriate for cylindrical surfaces.

FIG. 45 depicts trimming and mirroring of closing sections.

FIG. 46 depicts trimming and mirroring of closing sections.

FIG. 47 depicts combining trimmed and mirrored closing sections with tubular foldable surfaces.

FIG. 48 depicts mirroring of flat closing sections.

FIG. 49 depicts face/segment removal and mirroring of flat closing sections.

FIG. 50 shows combining of mirrored flat closing sections with tubular foldable sections.

FIG. 51 shows combining of different closing sections.

FIG. 54 depicts extension or removal of segments.

FIG. 55 shows shape stretching of symmetrical tubular and closing sections and their symmetrical combinations.

DETAILED DESCRIPTION

The advantages of the structures composed of the described collapsible modules/sections are:
  They are self-supporting and very stable in unfolded position;
  They can form smooth and round surfaces;
  They can be made of variety of different materials including more rigid ones;
  They can be produced by different methods and technologies;
  They can be very compact in folded position;
  They can be composed of both cylindrical and/or conical surfaces;
  They can operate also in partly folded states, giving variability in shape and size.

Tubular structures composed by combining and multiplying two or more foldable modules/sections and their modifications described in this specification keep their round shape naturally in unfolded position and are almost as stable as non-folding tubular structures when axially compressed until additional force is applied on particular spots along the mutual foldable edges that connect the modules/sections. The folding process involves an abrupt transition between unfolded (round-shaped) and semi folded (flat-shaped) states giving different behaviour of the structure in the two states. In the flat-shaped state these structures usually behave like springs. On the contrary, in unfolded position they behave like regular non-folding equivalents.

The abovementioned qualities give the option of taking advantage of foldability without compromising with the stability and the general performance of articles composed of such foldable sections. Moreover, even harder and non-rubber-like materials can be used reducing the thickness and the weight of the described foldable structures.

Figure 1:
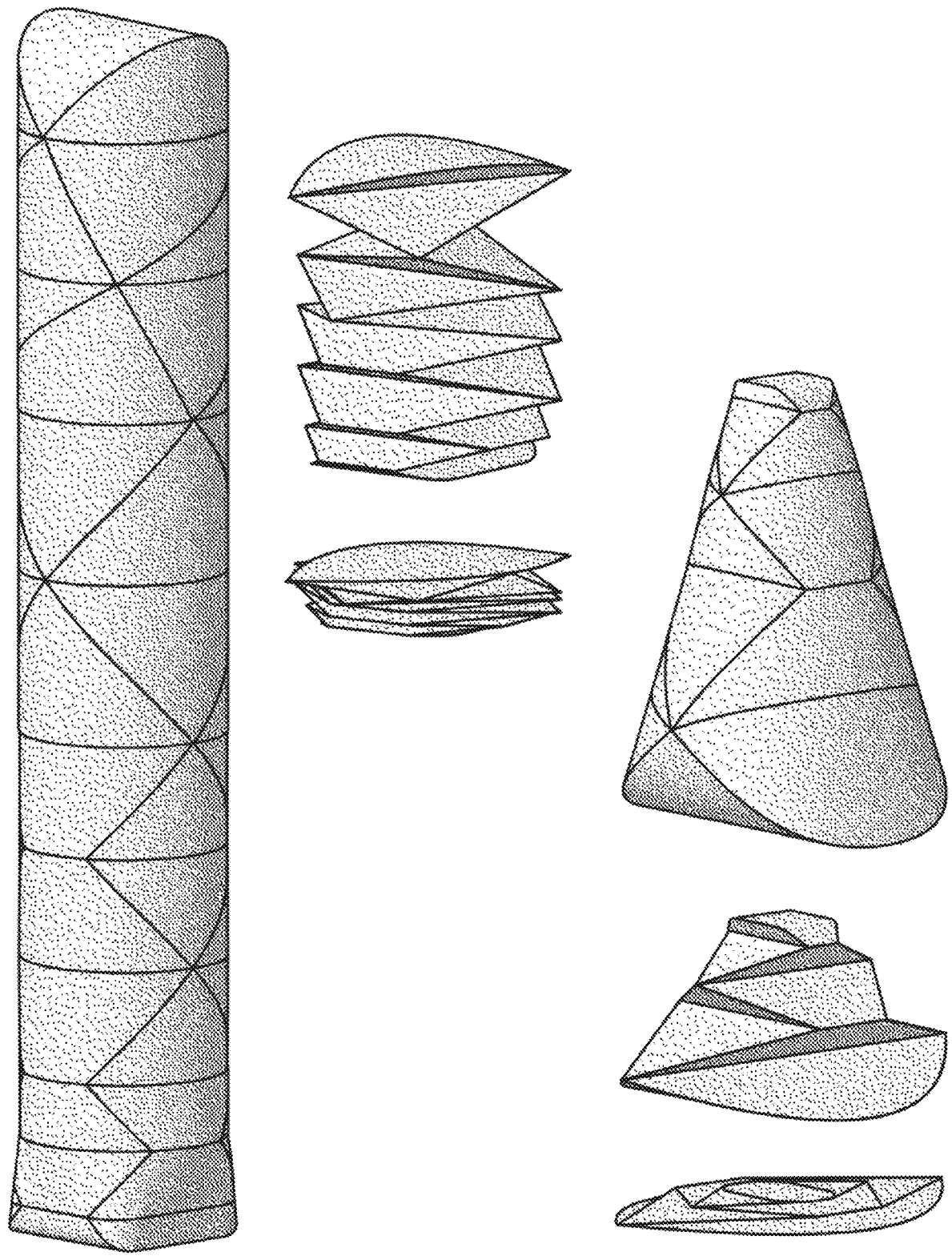
FIG. 1 shows examples of cylindrical and conical combinations of foldable modules/sections.

Examples of cylindrical and conical combinations of foldable modules/sections described below are shown in FIG. 1. The cylindrical example demonstrates that the tubular portion of such collapsible structures can contain different types of foldable sections.

Figure 2:
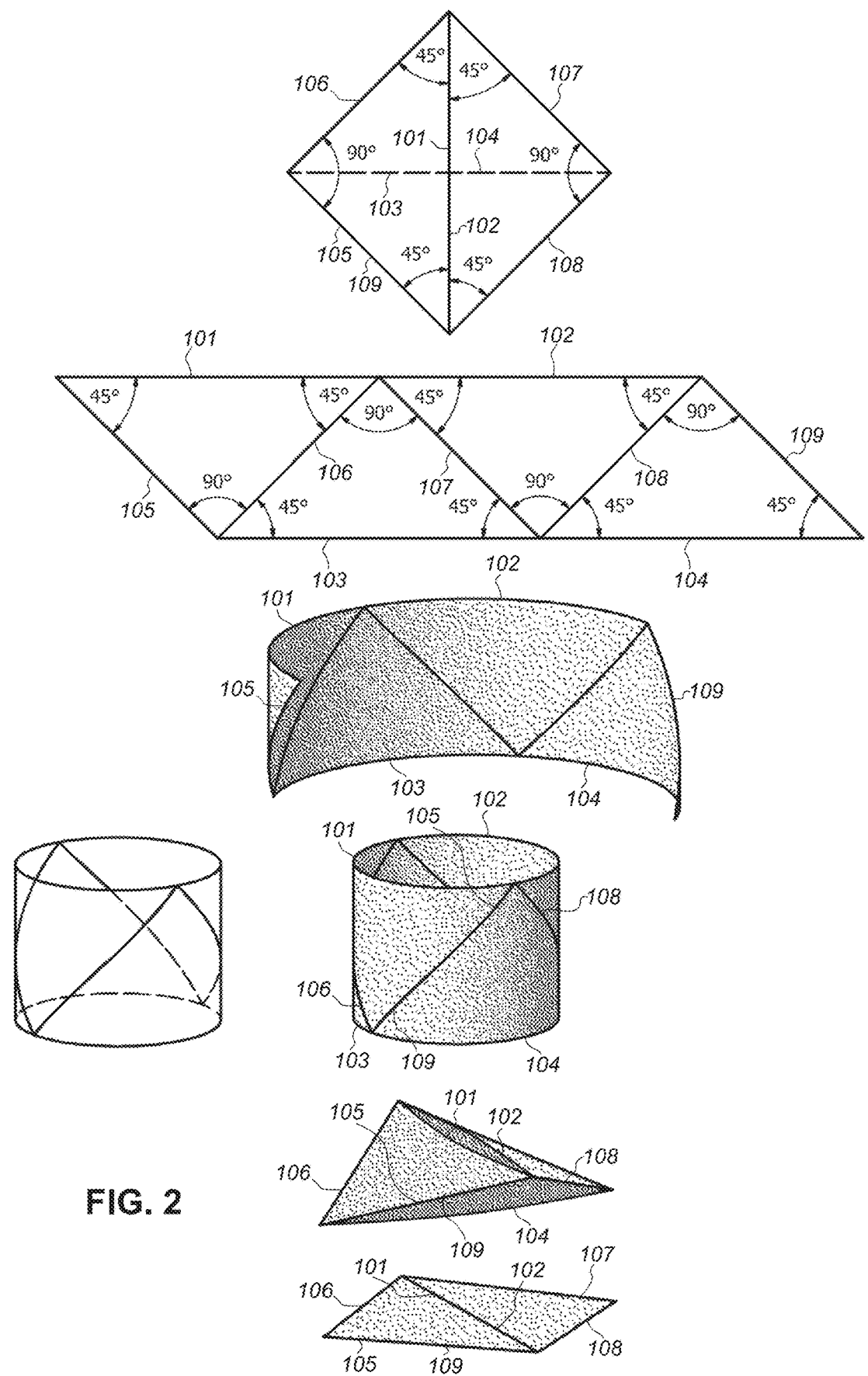
FIG. 2 shows a very simple and very symmetrical type of foldable section composed of four identical isosceles right-angled triangular segments.

An extremely simple and symmetrical type of foldable sections is shown in FIG. 2. It is composed of four identical isosceles right-angled triangular segments and folds in a square shape. The edges coinciding the hypotenuses 101,

102, 103, and 104 of the triangular segments form valley creases during folding when combined with other collapsible sections. The edges that coincide with the catheti 105, 106, 107, 108, and 109 (the internal edges) form mountain creases during folding. Foldable tessellations based on this collapsible unit are similar to the so-called Yoshimura pattern that describes the behaviour of buckling of thin cylindrical shell structures. The big difference is that the number of triangular segments in the looped strip they are composed of are reduced to four. This reduction brings the qualities explained in the previous paragraph, because in general, it is not the natural way a thin cylindrical shell collapses when exposed only to axial pressure. It requires extra force to be applied on the edges that form valley creases during folding in order to start the collapsing process. To unfold a structure composed of this type of folding sections it can be axially pulled or force can be applied on any two opposing convex vertices in unfolded or semi-folded state.

Another simple collapsible unit can be made of four identical non-isosceles right-angled triangular segments 110, 111, 112, 113 shown with bold continuous lines in FIG. 3. In this case it folds in a rectangular shape. It can be multiplied and combined with itself represented by triangular segments 114, 115, 116, 117 shown with thin continuous lines, with a mirrored version of itself represented by triangular segments 118, 119, 120, 121 shown with thin dashed lines, or it can be combined with a different set of identical right-angled triangular segments, including the one in FIG. 2.

Figure 4:
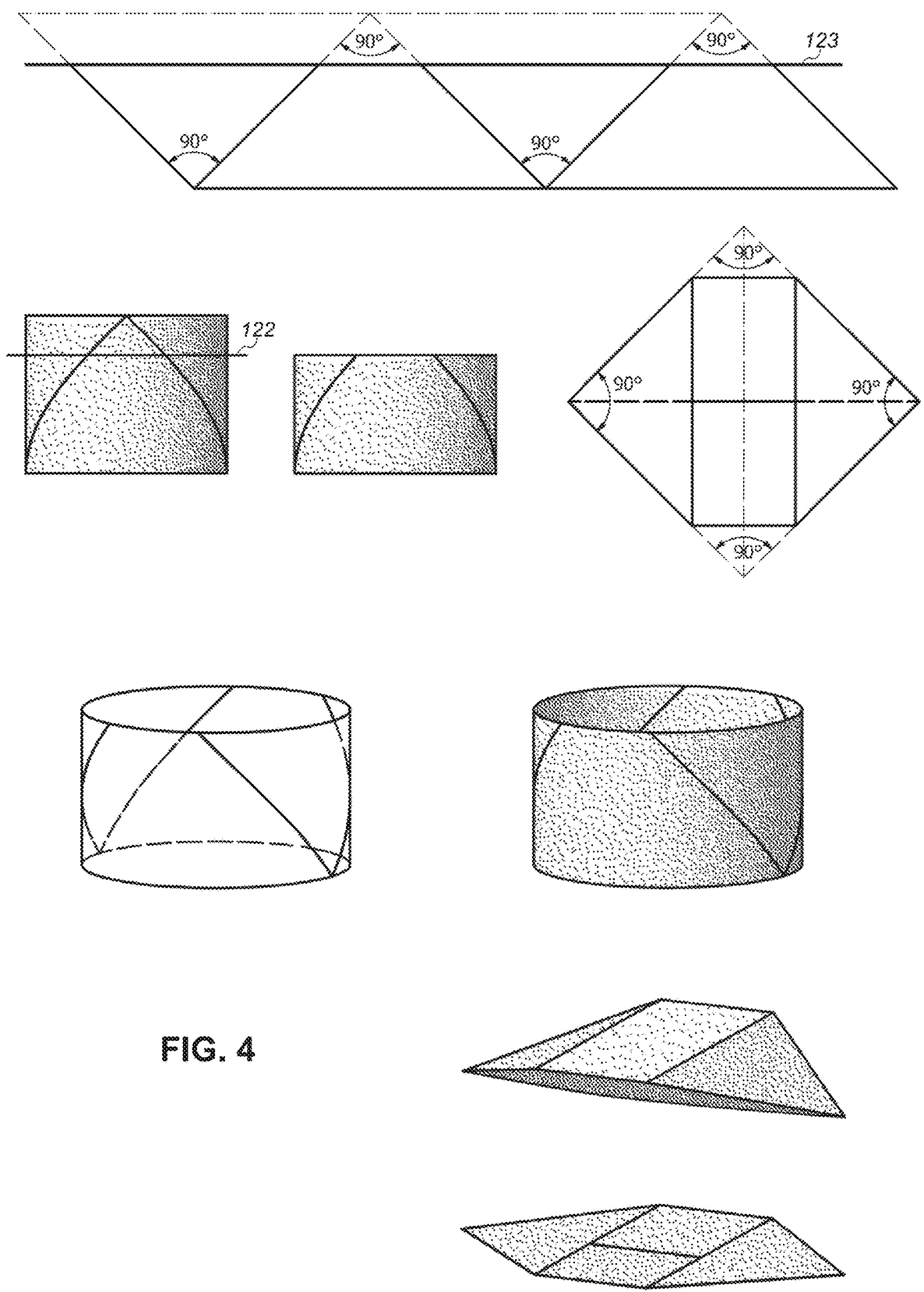
FIG. 4 shows a foldable cylindrical section composed of sets of two right-angled triangular segments and two trapezoid segments.

The foldable units shown in FIG. 2 and FIG. 3 can be modified by trimming them in rolled/looped state (forming tubular structure) with a plane 122 that is perpendicular to the axis of the cylinders they form giving sets of two right-angled triangular segments and two trapezoid segments FIG. 4. The same result can be achieved by cutting the unrolled section by a straight line 123 parallel to the hypotenuses.

Figure 5:
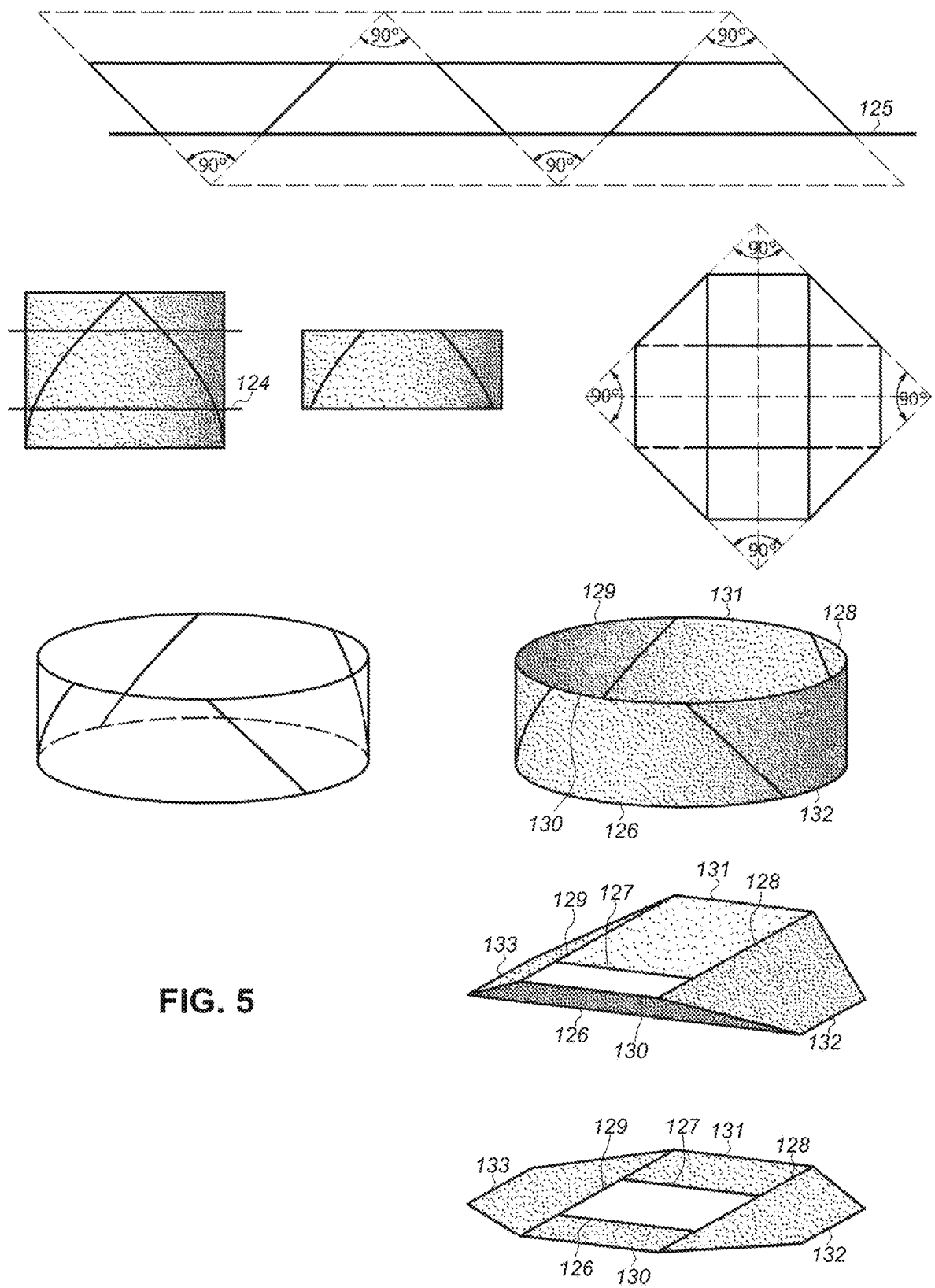
FIG. 5 depicts a foldable cylindrical section composed of four trapezoid segments.

By trimming these units with one more different plane 124 or line 125 of this type a foldable section composed of two pairs of trapezoid segments can be achieved FIG. 5. The two types of trapezoid segments can be identical or they can be different, depending on the place of the two cutting planes/lines. If the four trapezoid segments are isosceles the tessellations that this section can form are similar to the so called "chicken wire tessellation". The main difference again is that the number of trapezoid segments in the looped strip are reduced to just four, keeping the round shape of the tube naturally in unfolded position when combined with another appropriate foldable strip. The edges that coincide with the big bases of the trapezoid segments 126, 127, 128, and 129 form valley creases during folding when combined with other collapsible sections. On the contrary, the edges coinciding with the small bases of the trapezoid segments 130, 131, 132, and 133 form mountain creases when combined with other collapsible sections. These are the edges/hinges 130, 131, 132, and 133 that can be pressed to unfold the structure. Combinations composed of such sections experience less deformation of the material during folding and unfolding compared to the sections composed of triangular segments which makes them more appropriate when stiffer materials are used.

It is important to be known that trimmed sides of sections depicted in FIG. 3 can not be combined with cut modifications of sections depicted in FIG. 2 because their outer looped edges (in rolled state) do not coincide in folded position. They form a parallelograms in the first case and rectangles in the second. Trimmed sections of the type shown in FIG. 3 can not combine with themselves but they can be combined with mirrored versions of themselves.

Figure 6:
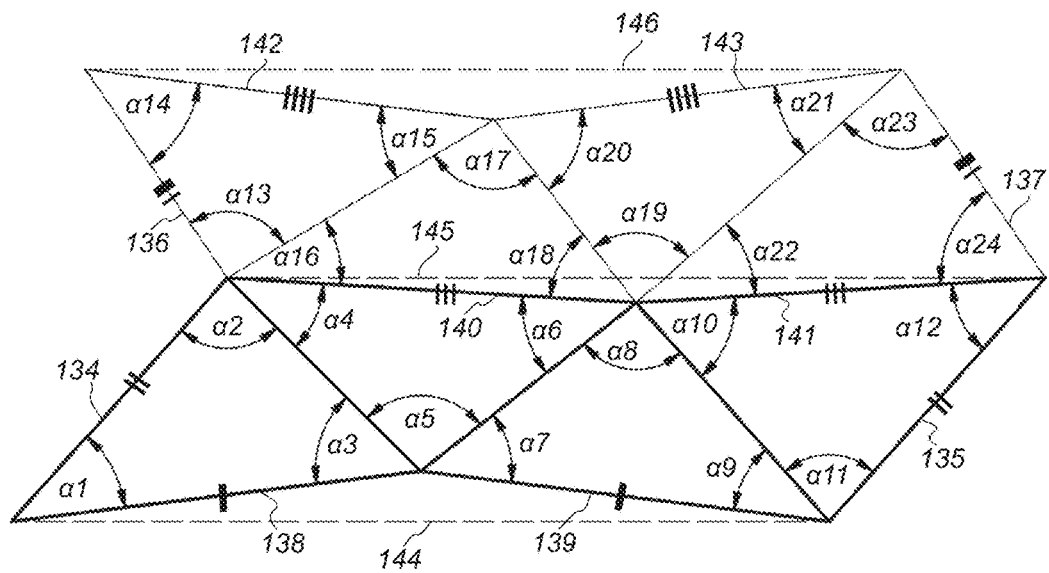
FIG. 6 shows general and/or asymmetric combinations and multiplications of foldable cylindrical sections composed of four triangular segments.
Figure 6:
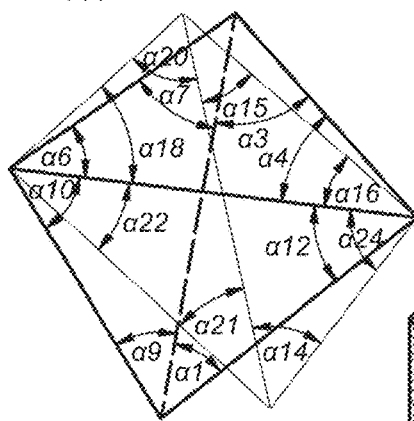
Figure 6:
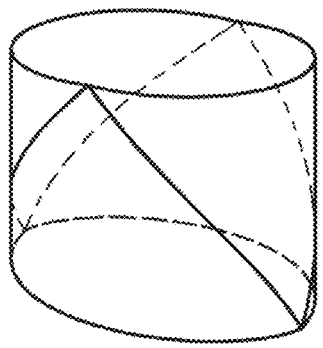
Figure 6:
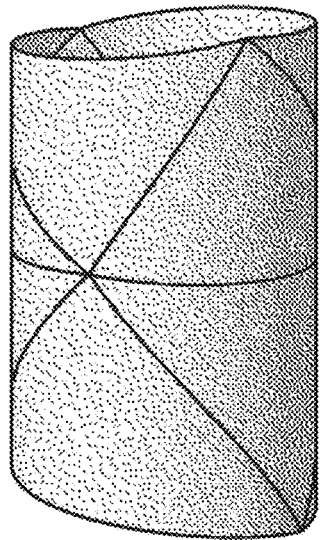
Figure 6:
Figure 6:
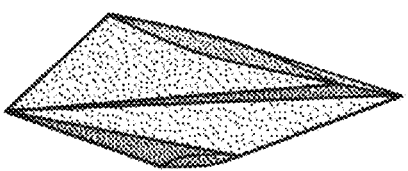
Figure 6:
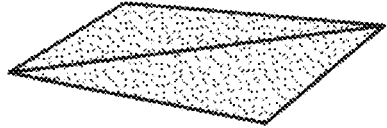
Figure 6:
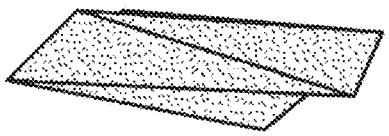

More general and/or asymmetric combinations and multiplications of foldable sections composed of four triangular segments that are not necessarily right-angled can be built (FIG. 6). The general rule in this case is that every angle in any of the four triangular segments that is between two angles from other two triangular segments must equal the sum of these two angles. The dependences of this type in FIG. 6 are: $\alpha 2=\alpha 4+\alpha 12$; $\alpha 5=\alpha 3+\alpha 7$; $\alpha 8=\alpha 6+\alpha 10$; $\alpha 11=\alpha 1+\alpha 9$ for the basic section shown in bold continuous lines in the upper drawing depicting an example in an unrolled state.

Following the same rule, the dependences between the angles in an appropriate section for combination shown with thin continuous lines are: $\alpha 13=\alpha 16+\alpha 24$; $\alpha 17=\alpha 15+\alpha 20$; $\alpha 19=\alpha 18+\alpha 22$; $\alpha 23=\alpha 14+\alpha 21$. Another important dependence is that the corresponding edges overlapping in rolled position 134 and 135, 136 and 137 or in folded position 138 and 139, 140 and 141, 142 and 143 have equal lengths. The edges coinciding in rolled/looped position 134 and 135, 136 and 137 are parallel. The geodesic lines 144, 145, and 146 connecting the vertices which overlap in rolled/looped position all have equal lengths, they are parallel when unrolled and are shown with thin dashed lines in the same upper drawing in FIG. 6.

The foldable sections depicted in FIG. 2 and FIG. 3 can be considered as special cases of this general geometric construction.

Figure 7:
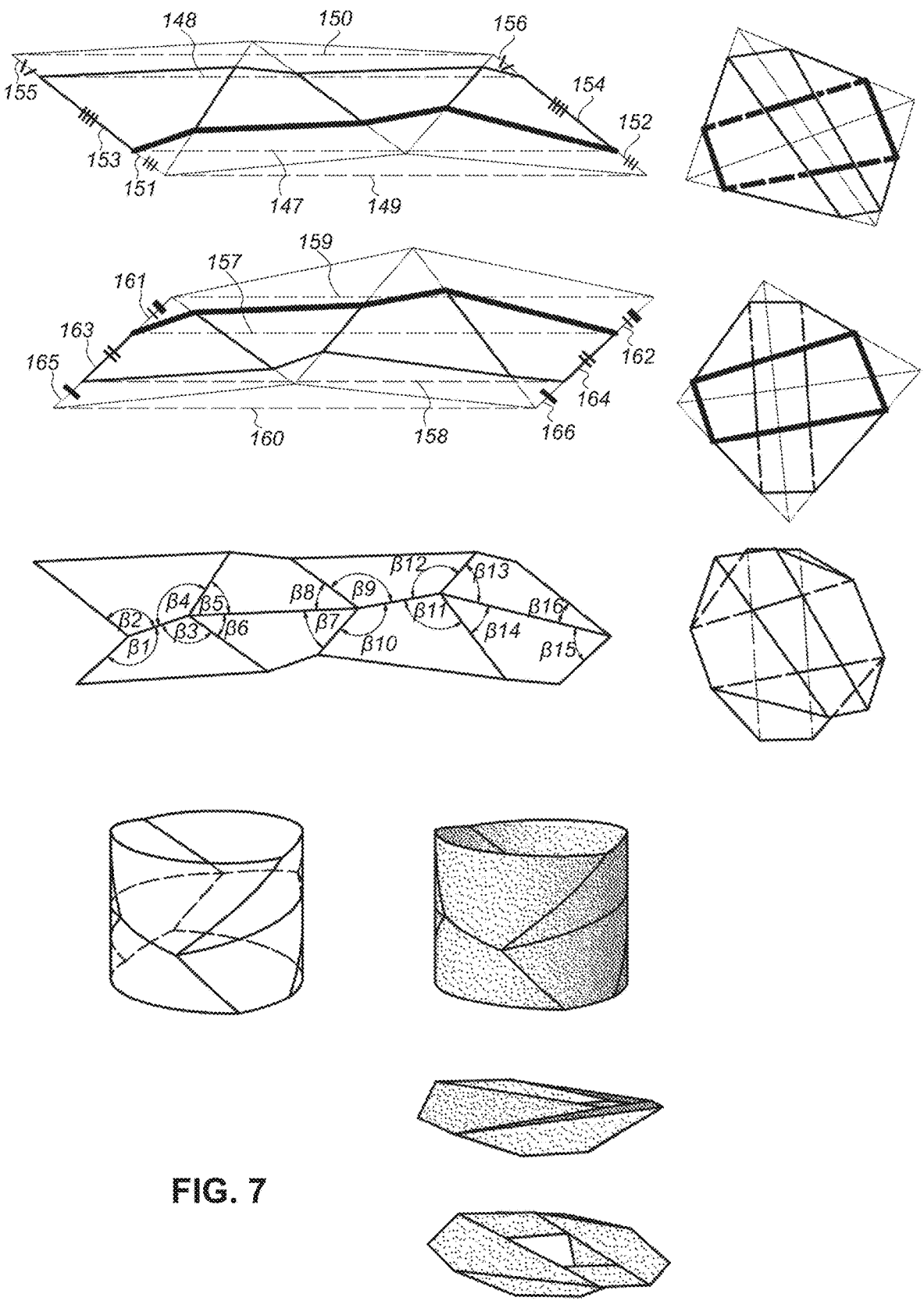
FIG. 7 depicts general and/or more asymmetric constructions of foldable cylindrical sections and their combinations composed of four quadrilateral segments or mixture between quadrilateral segments and triangular segments.

General and/or more asymmetric constructions of foldable sections and their combinations composed of four quadrilateral segments or mixture between quadrilateral segments and triangular segments are also possible (FIG. 7). They can be built by trimming one set of four triangular segments that satisfy the dependences in FIG. 6 by one or two nonintersecting polylines. Every endpoint of every line segment of such a polyline must lie on an edge/hinge that is common for two of the four triangular segments (an internal edge in rolled state). It can also coincide with an intersection of two edges/hinges of this type leaving a triangular segment not cut. The line segments of such polylines can not overlap these edges/hinges but they can overlap the outer looped (in rolled state) edges leaving a triangular segment not trimmed again.

The geodesic lines that connect the two endpoints of the whole polyline 147 and 148 are parallel to the geodesic lines connecting the vertices of the triangular segments which overlap in rolled position 149 and 150, they also have the same length and are shown with thin dashed lines in the upper two drawings in FIG. 7. The lengths of the corresponding segments that overlap in rolled state 151 and 152, 153 and 154, 155 and 156 are equal.

Using the endpoints of the segments of the polyline a new set of triangular segments satisfying the rules in FIG. 6 can be built. The geodesic lines that connect the two endpoints of the whole polyline 157 and 158 are again parallel to the geodesic lines connecting the vertices of the triangular segments which overlap in rolled position 159 and 160, they again have the same length. The lengths of the corresponding segments that overlap in rolled state 161 and 162, 163 and 164, 165 and 166 are again equal.

The internal edges/creases must not only go through the endpoints of the segments of the polyline, but also follow the rule of foldability of patterns composed of vertices incident to four edges—the sum of opposite sector angles equals 180°. This rule can be used when an endpoint along the polyline does not coincide with a vertex of any of the auxiliary (in this case) triangular segments. In FIG. 7 the dependences are:

$$\beta 3+\beta 5=\beta 4+\beta 6=\beta 7+\beta 9=\beta 8+\beta 10=\beta 11+\beta 13=\beta 12+\\ \beta 14=\beta 15+\beta 2=\beta 16++\beta 1=180°.$$

The foldable sections described in FIG. 4 and FIG. 5 can be considered as special cases of this general geometric construction. Even the general construction in FIG. 6 can be considered as a special case of one following the rules from FIG. 7 if the cutting polylines coincide and overlap the outer looped (in rolled state) edges of the triangular segments in the set. And vice-versa, the construction in FIG. 7 can be considered as a combination of modified/trimmed versions of foldable sections composed of four triangular segments.

The simple foldable sections depicted in FIG. 2 and FIG. 3 can form foldable combinations by mirroring them FIG. 8. This is valid also for their cut modifications depicted in FIG. 4 and FIG. 5. This is demonstrated in FIG. 9 and FIG. 10.

Foldable asymmetrical tubular sections composed of triangular segments, by a mixture of triangular segments and quadrilateral segments, or only of quadrilateral segments can also be modified by trimming them by planes perpendicular to their longitudinal axis and then mirrored. The planes must intersect all four internal edges/hinges in a foldable section.

Not only cylindrical but also conical foldable sections composed of four polygons are possible.

A simple and symmetrical one is shown in FIG. 11. It is composed of two pairs of isosceles triangular segments and is similar to the cylindrical foldable unit shown in FIG. 2. The main difference is that the 45° angles are decreased in one of the pairs 169 and 170 and respectively increased with the same degree in the other pair of triangular segments 167 and 168. Angle $\alpha 25=45°+\Delta 1$ and angle $\alpha 26=45°-\Delta 1$. It folds in rhomboidal shape. This type of foldable section can be combined with a scaled version of itself where triangular segments 173 and 174 are similar to 167 and 168 and triangular segments 171 and 172 are similar to 169 and 170. These types of foldable patterns can also be combined with the next type of foldable section described below.

Figure 12:
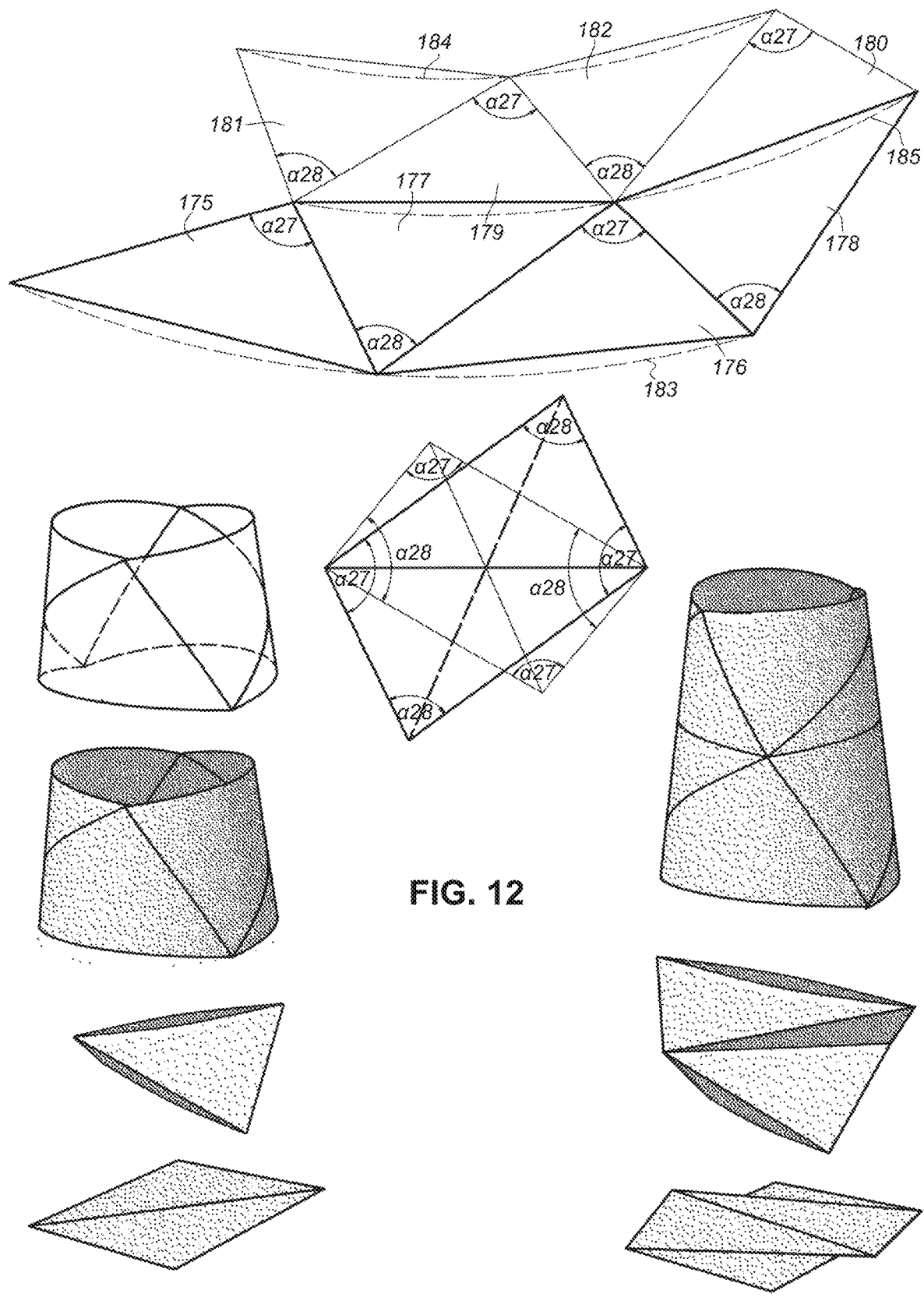
FIG. 12 demonstrates a simple section and its combination/multiplication composed of non-isosceles triangular segments.

The simple foldable conical section presented in FIG. 12 is similar to the cylindrical one shown in FIG. 3. The main difference is that the 90° angles are increased in pairs 175 and 176 in the first section and 179 and 180 in the second section and respectively decreased with the same degree in pairs 177 and 178 in the first section and 181 and 182 in the second section. Angle $\alpha 27=90°+\Delta 2$ and angle $\alpha 28=90°-\Delta 2$. Such sections fold in parallelograms. All of the vertices of the four triangular segments in a section lie on concentric arcs 183, 184, 185 when unrolled, their center is the apex of the unrolled conical surface.

Figure 13:
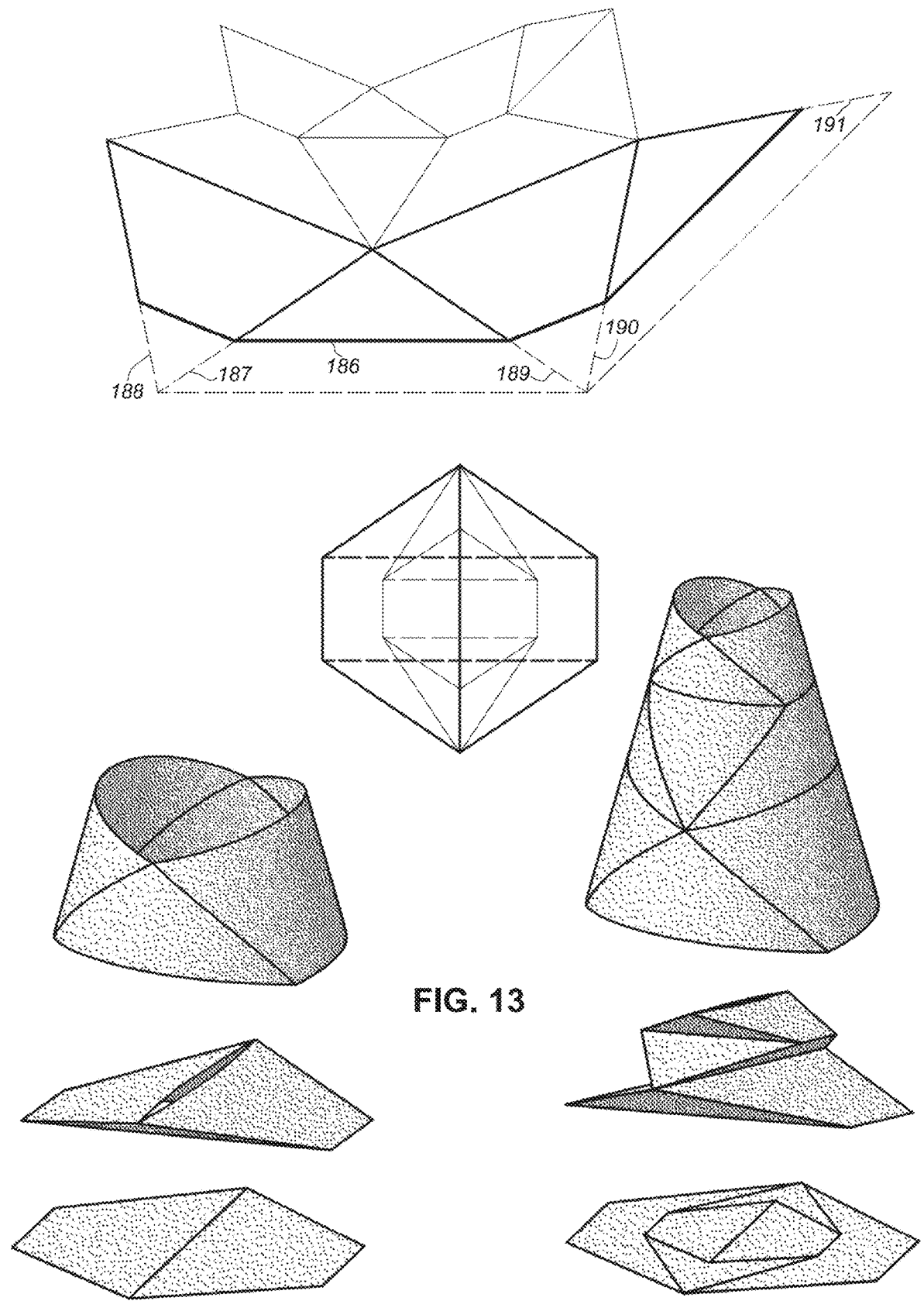
FIG. 13 depicts a conical section and its combination/multiplication composed of triangular segments and trapezoid segments.
Figure 14:
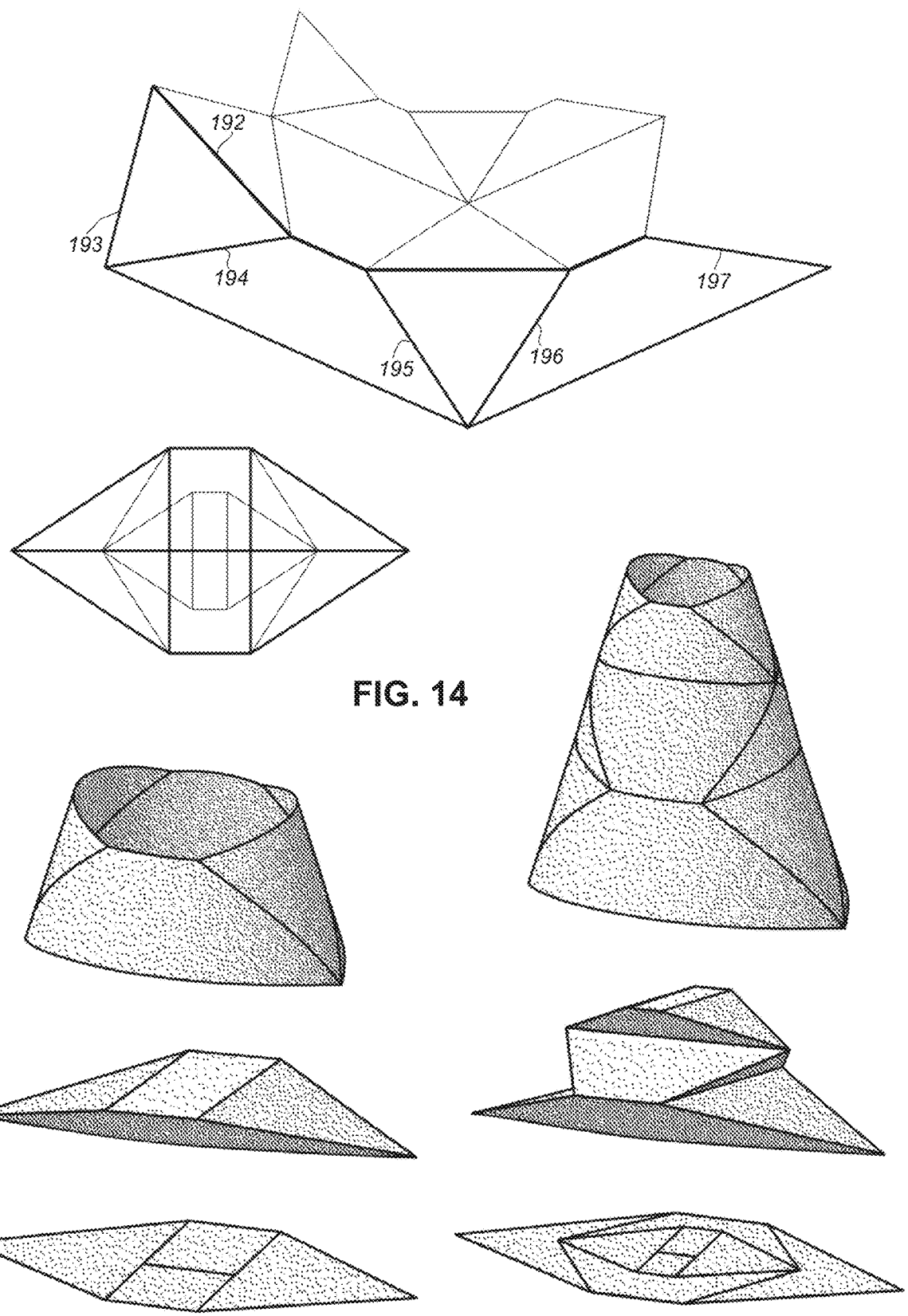
FIG. 14 depicts a conical section and its combination/multiplication composed of triangular segments and trapezoid segments.

Foldable modifications can be built by trimming the four triangular segments in the conical constructions shown in FIG. 11 and FIG. 12 by polylines 186, 192 composed of segments parallel to the outer edges, looped in rolled state (FIG. 13 and FIG. 14). The endpoints of the segments must lie on the edges/hinges that are common for two corresponding triangular segments from the same set (the internal edges/hinges) 187, 188, 189, 190, 191 and 193, 194, 195, 196, 197. Similar to the cylindrical equivalents, the trimmed sections in FIG. 12 can not combine with trimmed and scaled versions of themselves and with the ones from FIG. 11 but they can combine with constructions that satisfy the rule of foldability of patterns composed of vertices incident to four edges explained in FIG. 7—the sum of opposite sector angles equals 180°.

Sections composed of four trapezoid segments are also possible if the triangular segments are cut by two different polylines 198, 199 (FIG. 15).

Figure 16:
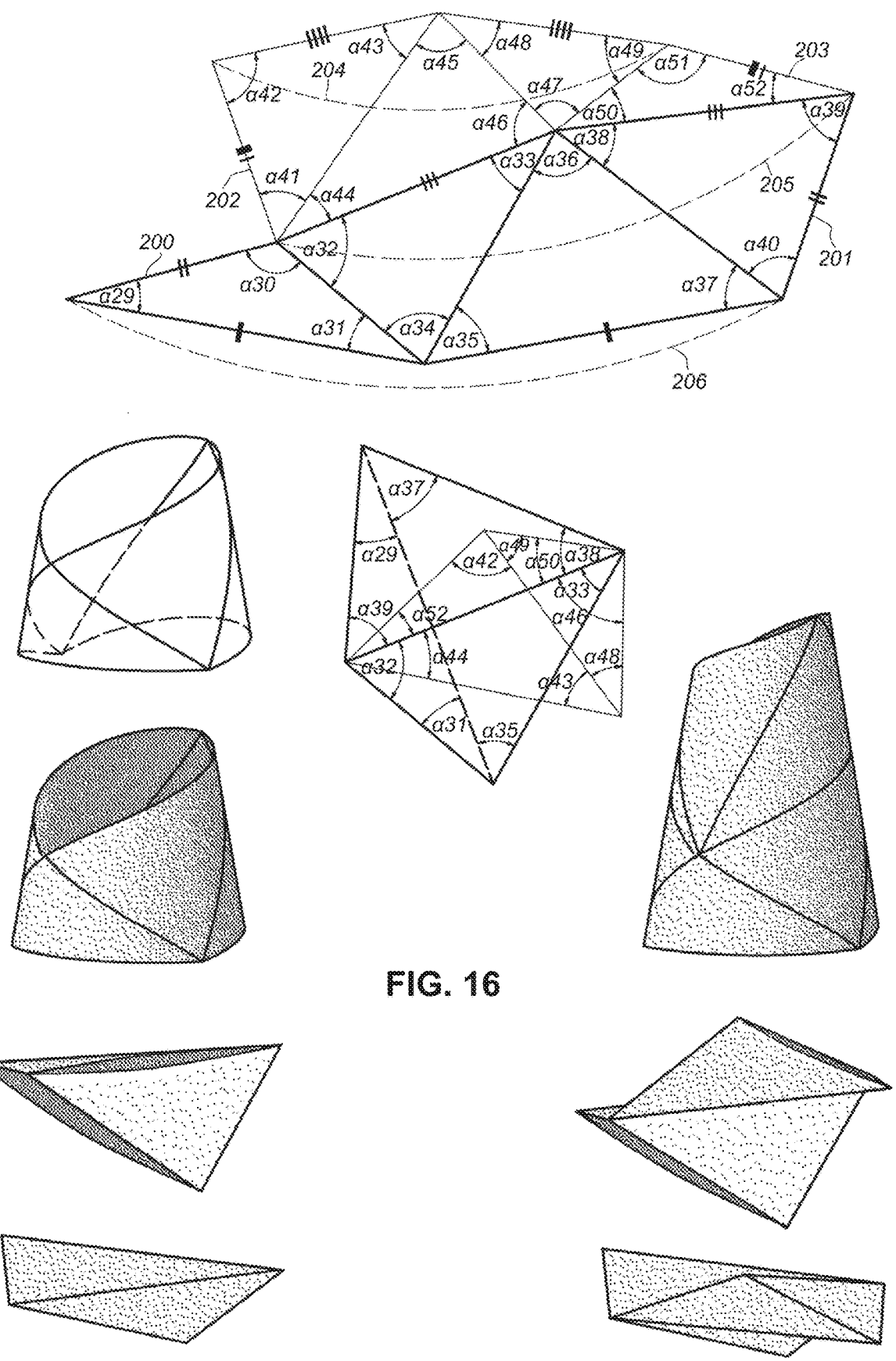
FIG. 16 shows general and/or asymmetric combinations and multiplications of foldable conical sections composed of four triangular segments.

More general foldable conical constructions composed of four triangular segments can be built (FIG. 16). They are similar to the cylindrical ones (FIG. 6). The main difference is that the edges/hinges that coincide in rolled position 200 and 201, 202 and 203 are not parallel in the unrolled one. They are rotated relative to one another around the apex of the unrolled conical surface. Their endpoints lie on concentric arcs 204, 205, 206 with centers the apex too. The dependences between the angles follow the same rule: $\alpha 30=\alpha 32+\alpha 39$; $\alpha 34=\alpha 31+\alpha 35$; $\alpha 36=\alpha 33+\alpha 38$; $\alpha 40=\alpha 37+\alpha 29$ for the initial section shown with bold continuous lines and $\alpha 41=\alpha 44+\alpha 52$; $\alpha 45=\alpha 43+\alpha 48$; $\alpha 47=\alpha 46+\alpha 50$; $\alpha 51=\alpha 42+\alpha 49$ for the appropriate foldable set of four triangular segments it is combined with. Edges that overlap in folded position have equal lengths. The constructions in FIG. 11 and FIG. 12 can be considered as special cases of this general construction.

Figure 17:
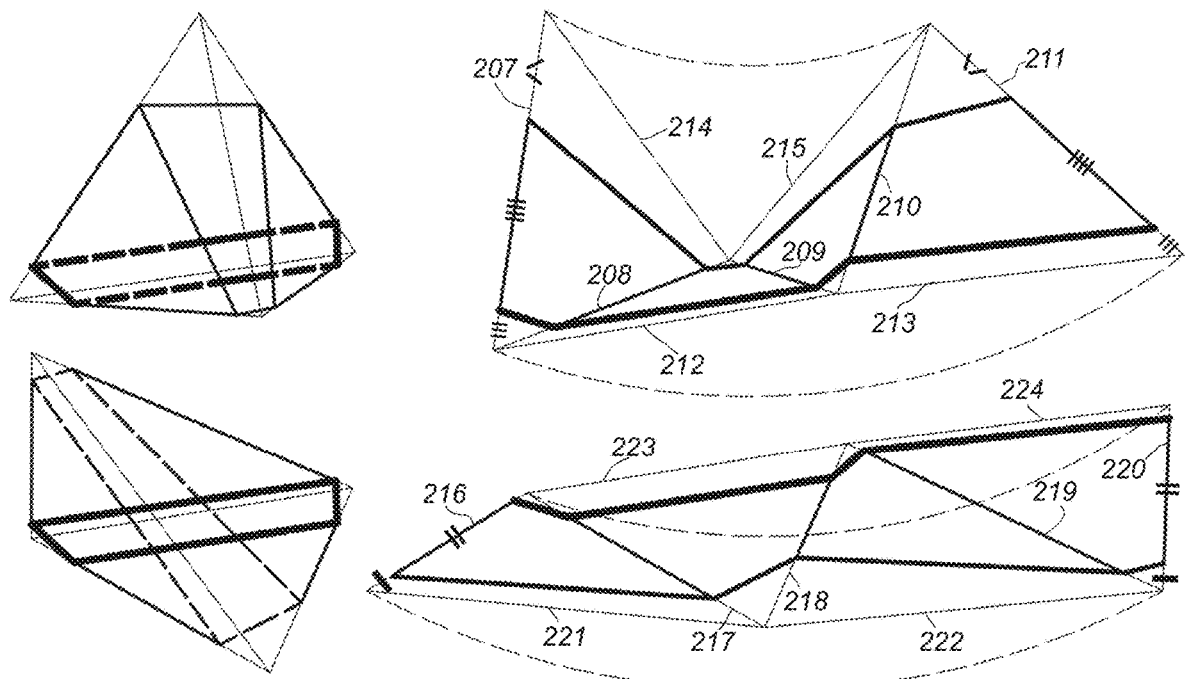
FIG. 17 depicts general and/or more asymmetric constructions of foldable conical sections and their combinations composed of four quadrilateral segments or mixture between quadrilateral segments and triangular segments.
Figure 17:
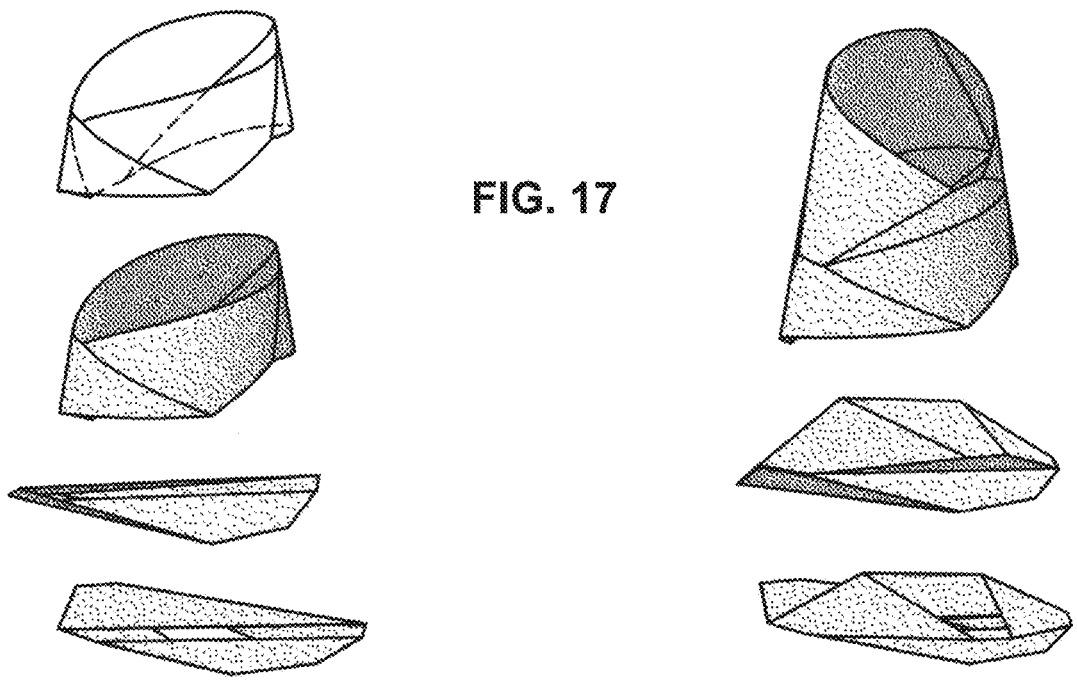

More general constructions and combinations of foldable conical sections composed of quadrilateral segments or mixture between quadrilateral segments and triangular segments, similar to the cylindrical ones depicted in FIG. 7, are possible too (FIG. 17). They can be built following the same procedures. An initial foldable section composed of four triangular segments following the rules in FIG. 16 is then cut by one or two non-intersecting polylines. The endpoints of the sectors of the polylines must lie on the internal edges/hinges in the set 207, 208, 209, 210, 211. They can also coincide with the intersection of two edges leaving a triangular segment not cut. The two endpoints of the whole polyline must lie on an arc with center the apex of the unrolled conical surface. Using the endpoints of the sectors of the initial polyline a new set of four foldable triangular segments can be built where the internal edges/hinges of the new set 216, 217, 218, 219, 220 must go through the endpoints of the initial polyline and the general rule of foldability of patterns composed of vertices incident to four edges can be used again—the sum of opposite sector angles equals 180°. In this case the equations are:

$$\beta 17+\beta 32=\beta 18+\beta 31=\beta 19+\beta 21=\beta 20+\beta 22=\beta 23+\\ \beta 25=\beta 24+\beta 26=\beta 27+\beta 29=\beta 28+\beta 30=180°.$$

The foldable sections in FIG. 13, FIG. 14, and FIG. 15 can be considered as special cases of this general construction.

The general construction in FIG. 16 can also be considered as a special case of the one in FIG. 17 if the cutting polylines coincide and overlap the outer looped (in rolled state) edges of the triangular segments in the particular set 212, 213, 214, 215 and 221, 222, 223, 224. And vice-versa, the construction in FIG. 17 can be considered as a combination of modified/trimmed versions of foldable conical sections composed of four triangular segments. Moreover, cylindrical foldable sections can be considered as spacial cases of their conical modifications with apexes at infinity. This way all conical and cylindrical sections described can be considered as special cases of the construction shown in FIG. 17 or as modifications of the one depicted in FIG. 16.

Mirrored versions of the general cylindrical and conical sections are also foldable.

Rolling the tessellations in opposite direction will also result in mirrored versions.

Figure 18:
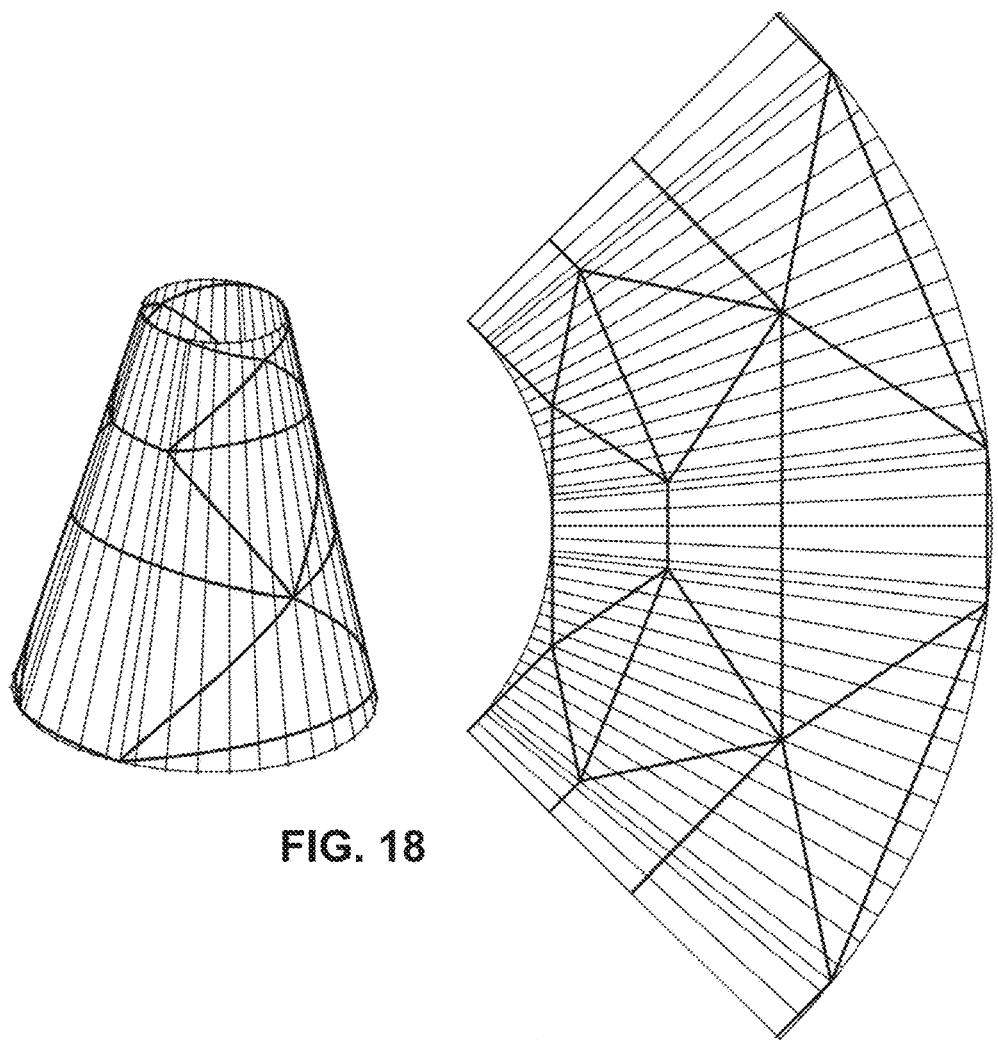
FIG. 18 depicts a practical way to build a rolled version from an unrolled one and vice-versa of any cylindrical or conical foldable sections and their combinations.

A practical way to build a rolled version from an unrolled one and vice-versa of any of the described cylindrical or conical foldable sections and their combinations is by drawing a net of lines and finding the corresponding points of intersection between them and the edges/hinges (FIG. 18). Straight lines in unrolled state appear as geodesic ones in the rolled state and vice-versa.

Figure 19:
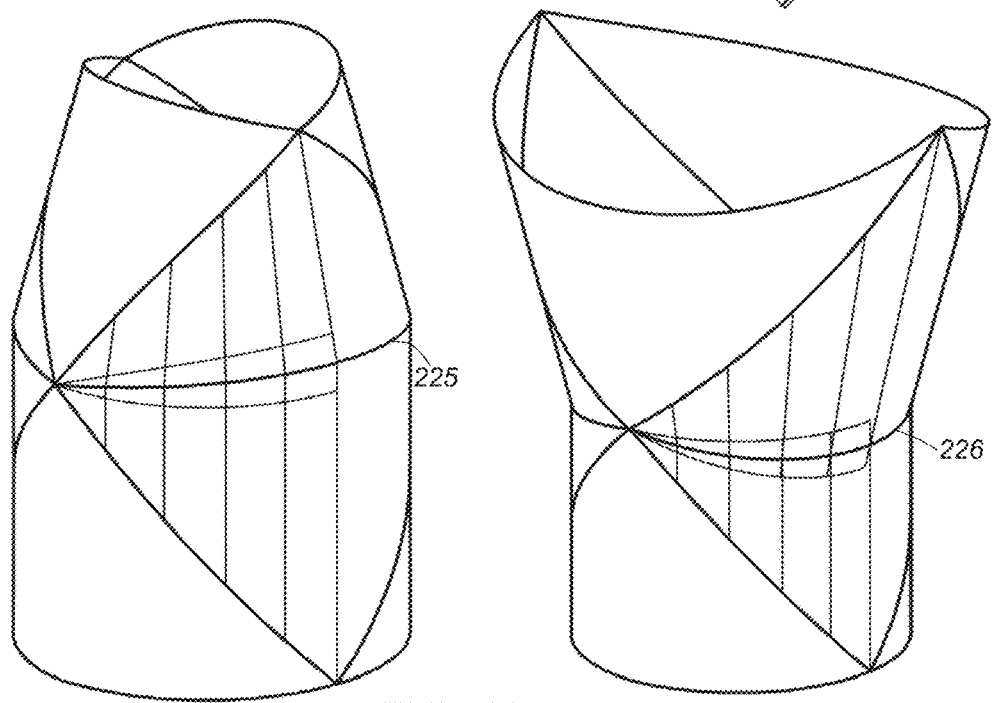
FIG. 19 demonstrates the need of correction of outer edges when mixing foldable sections defining different surfaces.

When two sections with different surfaces are combined the shape of the corresponding edges must be corrected. When the new common edge/hinge is a mountain one 225 the two surfaces must be extended equally. On the contrary, if it is a valley one 226 they must be contracted equally (FIG. 19).

Figure 20:
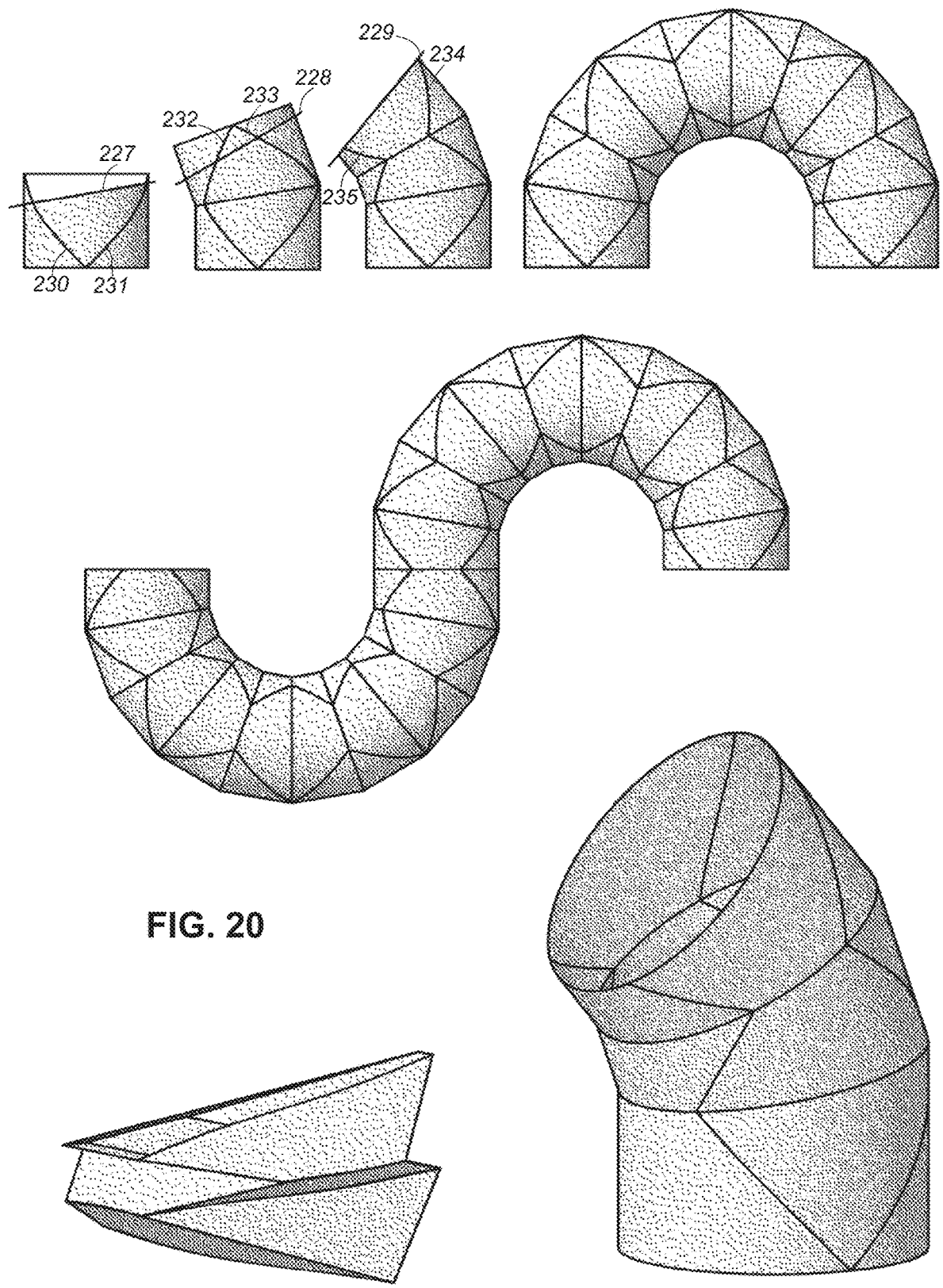
FIG. 20 shows trimming and mirroring of cylindrical or conical foldable sections and/or combinations between such sections.

Every cylindrical or conical foldable section described above can be trimmed and mirrored by a free plane 227, 228, 229, 236, 237 intersecting all of its four internal edges/hinges in a foldable section 230, 231, 232, 233, 234, 235, 238, 239, 240, 241 giving new foldable combinations (FIG. 20 and FIG. 21). The plane can be inclined with respect to only one of the planes of symmetry, as shown in the examples, or it can be a random plane intersecting all of the internal edges/hinges. If needed, a surface 242 can be extended first 243 and then trimmed and mirrored (FIG. 22). The cutting plane can also go through the endpoints of the internal edges/hinges 244, 245.

Several types of closing foldable units can be combined with the described cylindrical and conical sections and their modifications.

Figure 23:
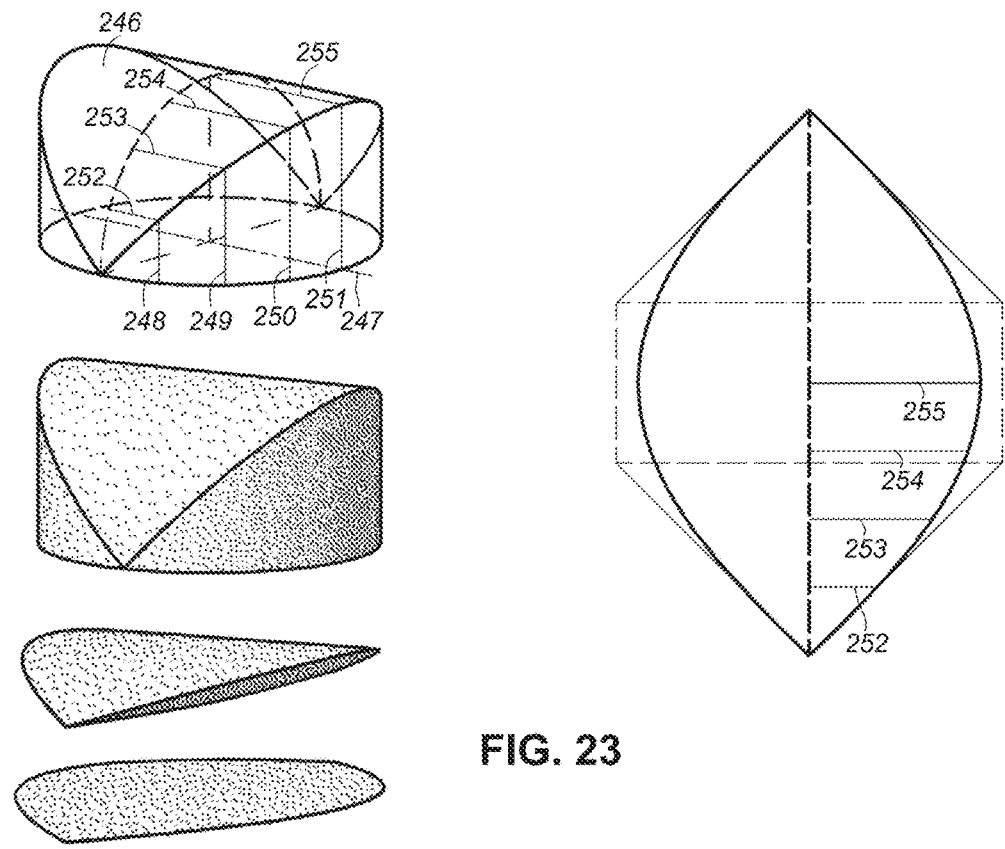
FIG. 23 depicts a very simple round collapsible closing section appropriate for cylindrical surfaces.
Figure 23:
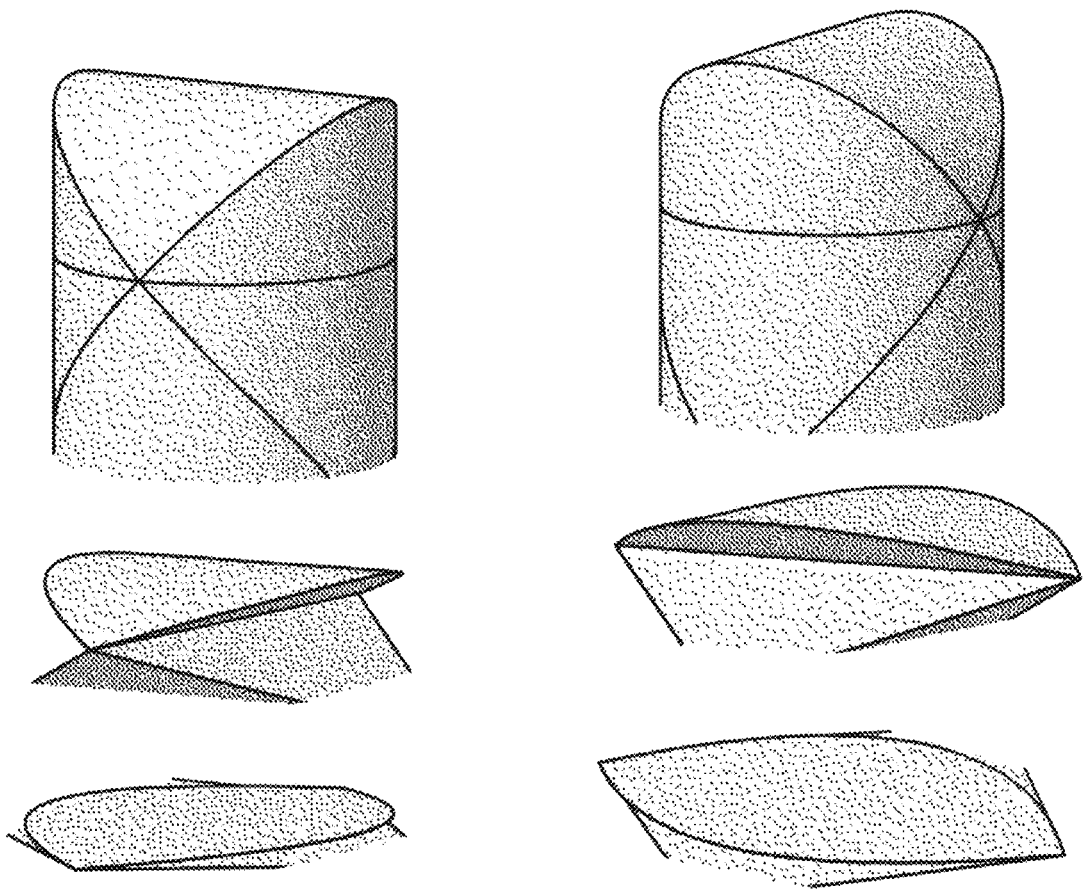

A round and simple section is shown in FIG. 23. It can be built as an intersection of the sections in FIG. 2 or FIG. 3 with an identical longitudinally halved cylindrical surface 246 with an axis going through the midpoints of the hypotenuses of the rolled right-angled triangular segments 247. It can also be built by drawing a parallel net of pairing lines 248 and 252, 249 and 253, 250 and 254, 251 and 255 having equal lengths that overlap in folded position as shown in the upper drawings of FIG. 23.

Figure 24:
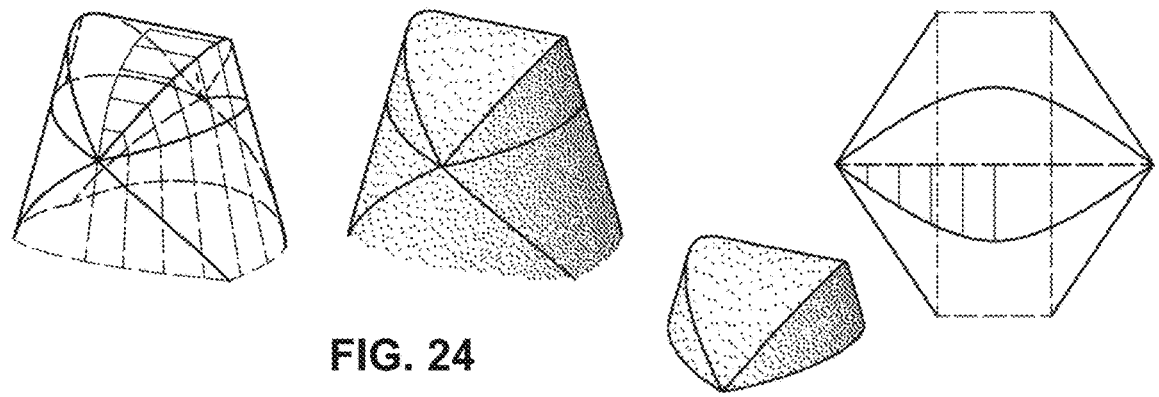
FIG. 24 depicts a very simple round collapsible closing section appropriate for conical surfaces.
Figure 25:
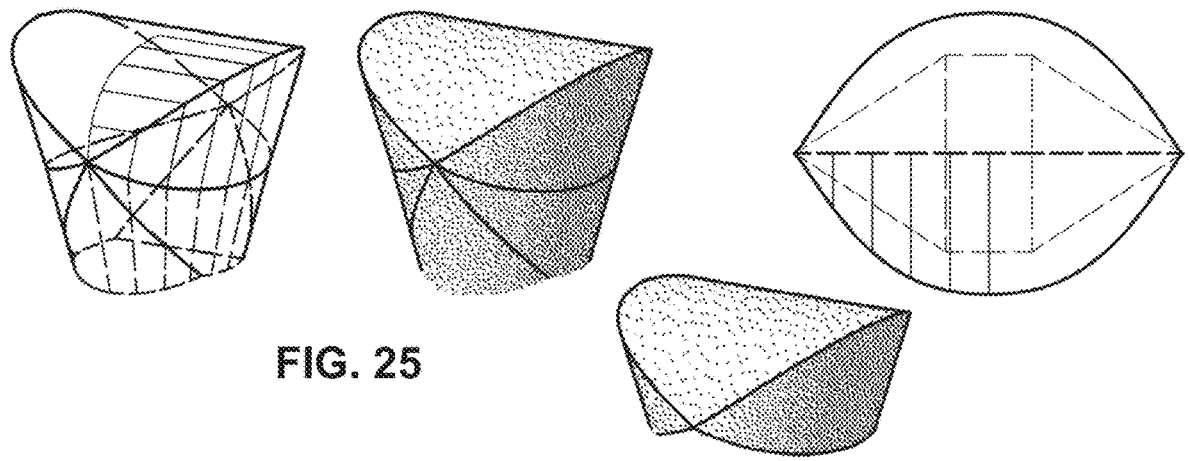
FIG. 25 depicts a very simple round collapsible closing section appropriate for conical surfaces.

With some approximation the pairing line strategy can be used to build closing foldable sections for conical surfaces (FIG. 24 and FIG. 25).

Figure 26:
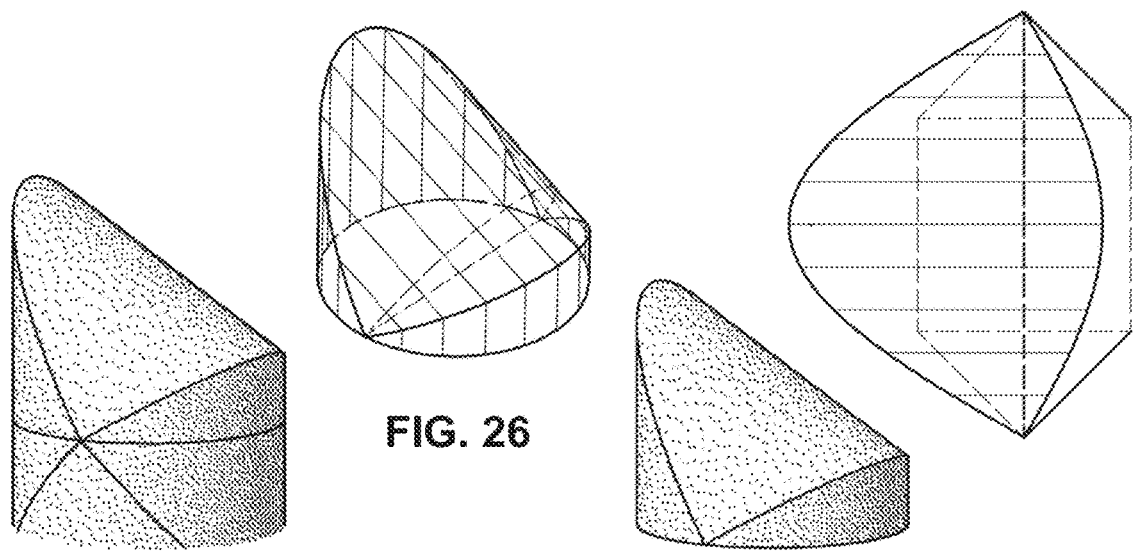
FIG. 26 shows an asymmetrical closing section for cylindrical or conical surfaces.

More asymmetrical closing sections for tubular surfaces can also be built (FIG. 26). In this case the lengths of the line segments lying on the closing surface equal the sum of the lengths of the corresponding segments lying on the looped tubular surface or its close approximation. If the cross section of the tubular surface they close is not symmetrical this type of closing section will also be more asymmetrical than the example in FIG. 26.

Figure 28:
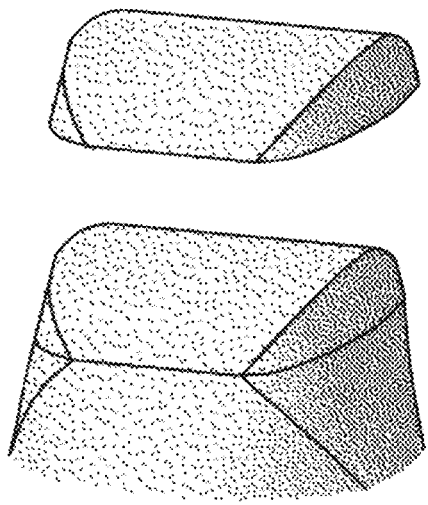
FIG. 28 demonstrates a trimmed round collapsible closing section appropriate for conical surfaces.
Figure 28:
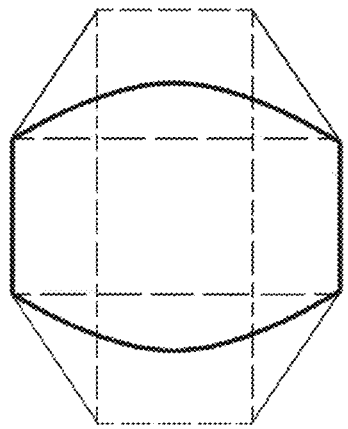
Figure 29:
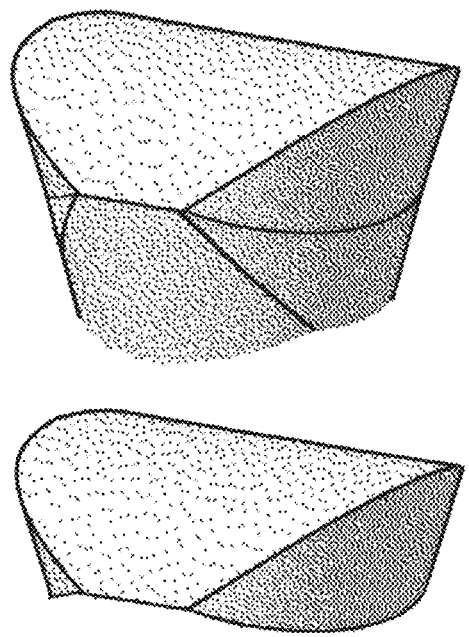
FIG. 29 demonstrates a trimmed round collapsible closing section appropriate for conical surfaces.
Figure 29:
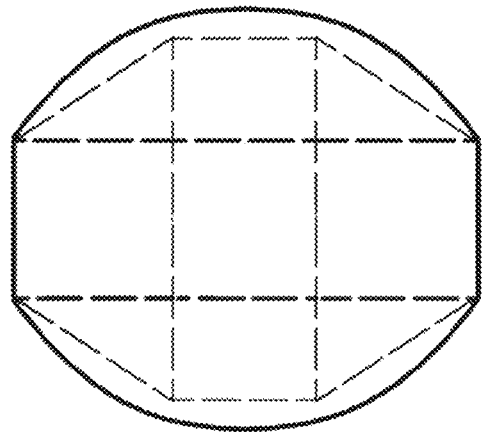

The foldable closing sections explained above can be trimmed and combined with trimmed cylindrical and conical sections (FIG. 27, FIG. 28, FIG. 29). The general rule is that the corresponding outer edges of the two sections that are combined must have equal lengths and same shapes in folded and unfolded position.

Figure 30:
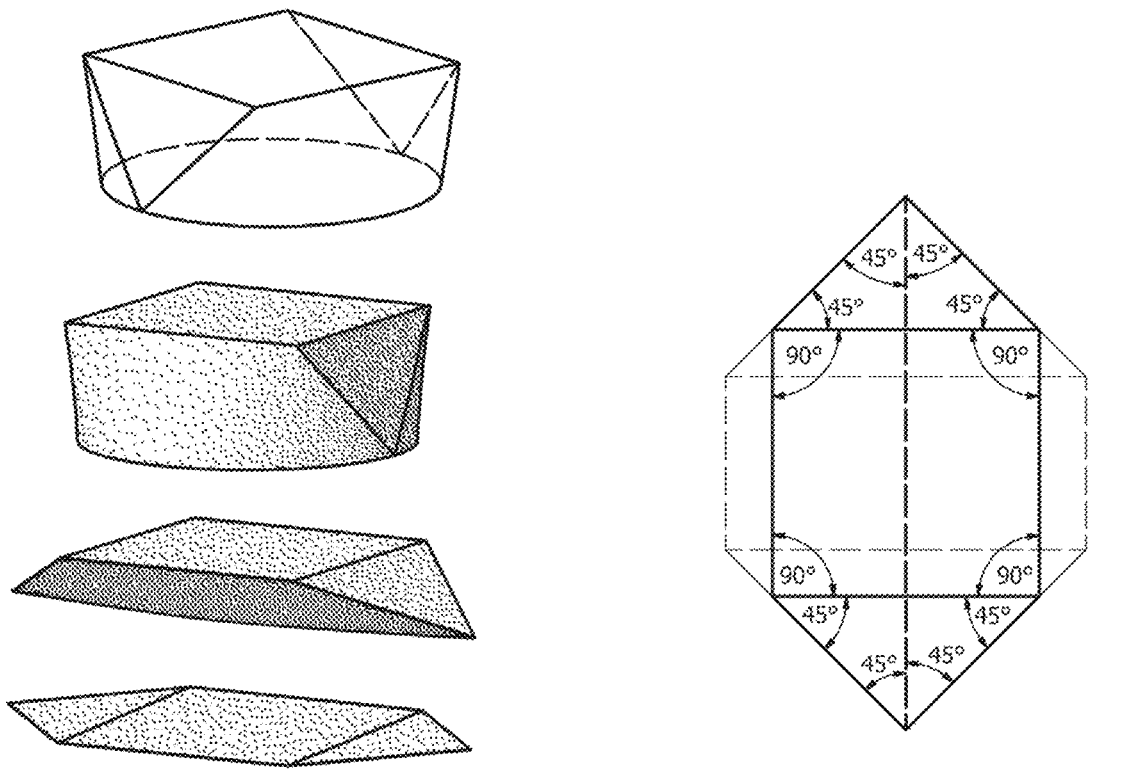
FIG. 30 depicts a very simple flat collapsible closing section appropriate for cylindrical surfaces.
Figure 30:
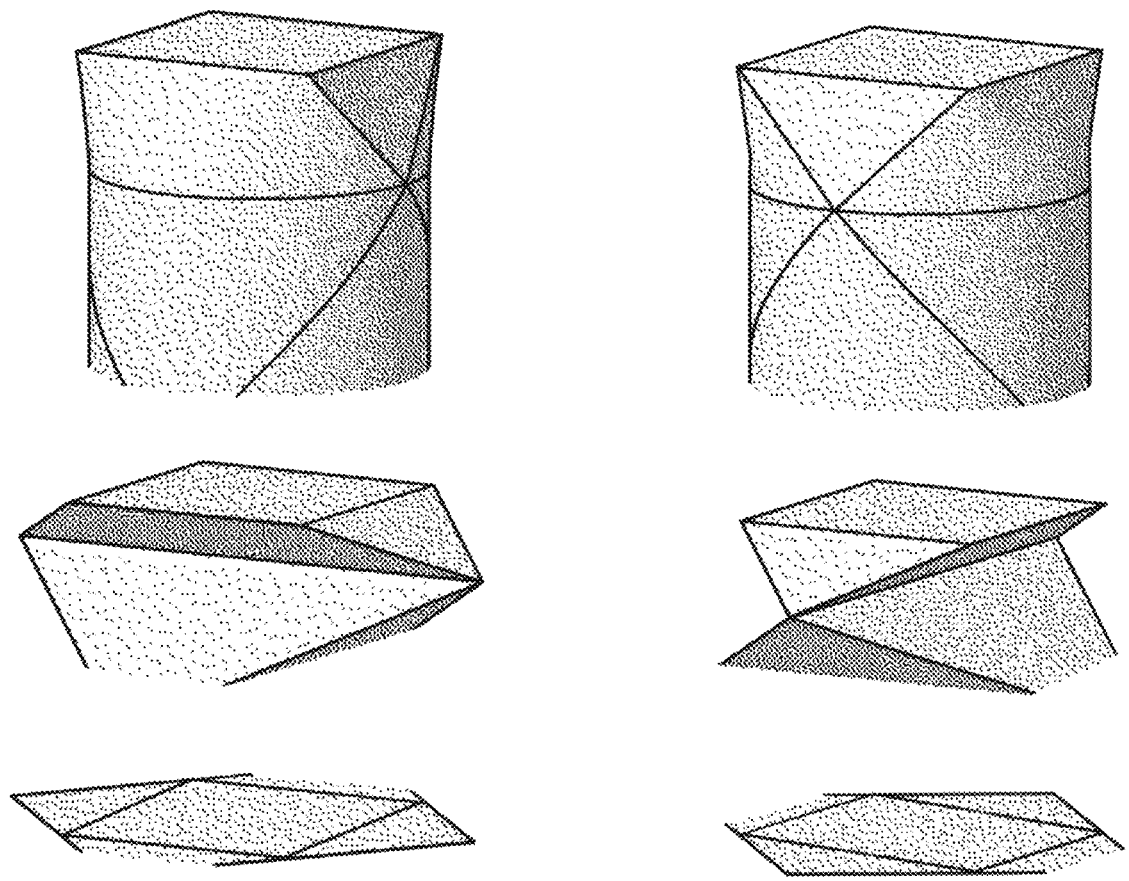

Flat rectangular closing sections ae also possible (FIG. 30, FIG. 31, FIG. 32). The equality of angles in FIG. 31 and FIG. 32 is shown with α53 and α54. The examples shown are for square flat closing surfaces but keeping the angle dependencies nonsquare rectangular units can be built.

Figure 33:
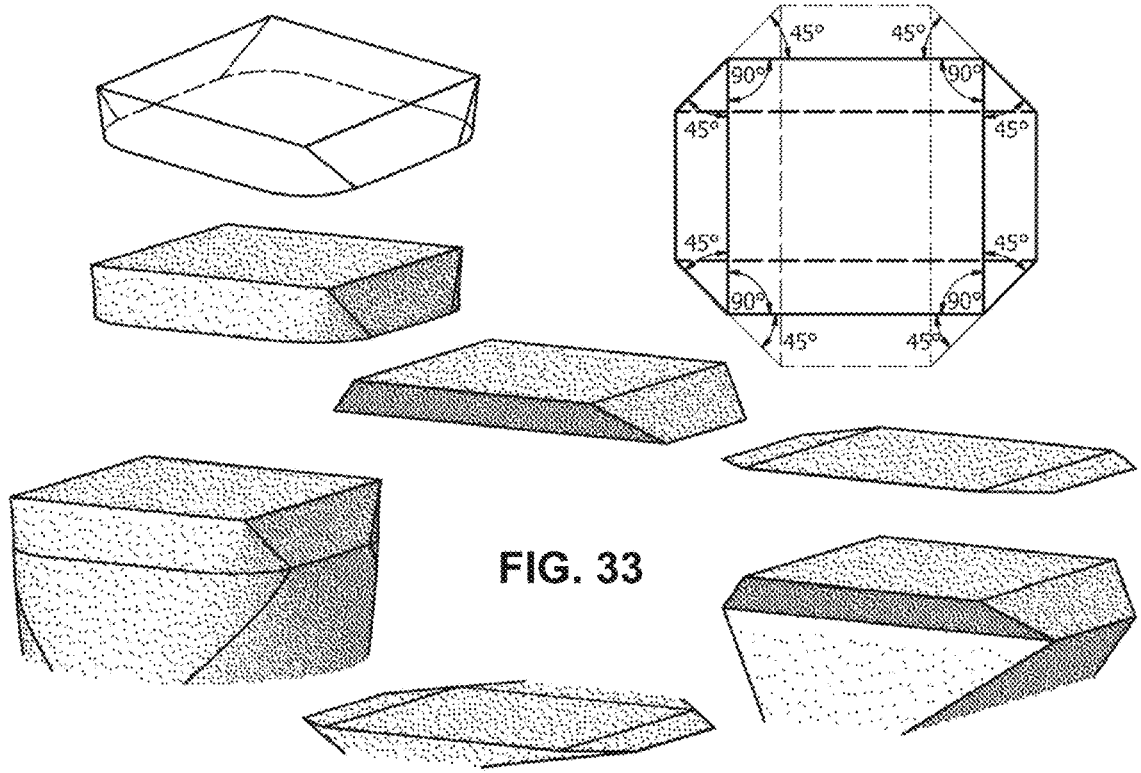
FIG. 33 shows a trimmed flat collapsible closing section appropriate for cylindrical surfaces.
Figure 34:
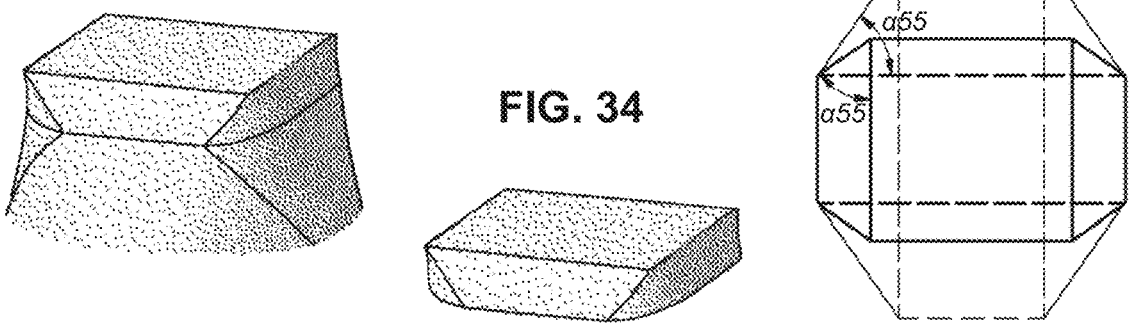
FIG. 34 shows a trimmed flat collapsible closing section appropriate for conical surfaces.
Figure 35:
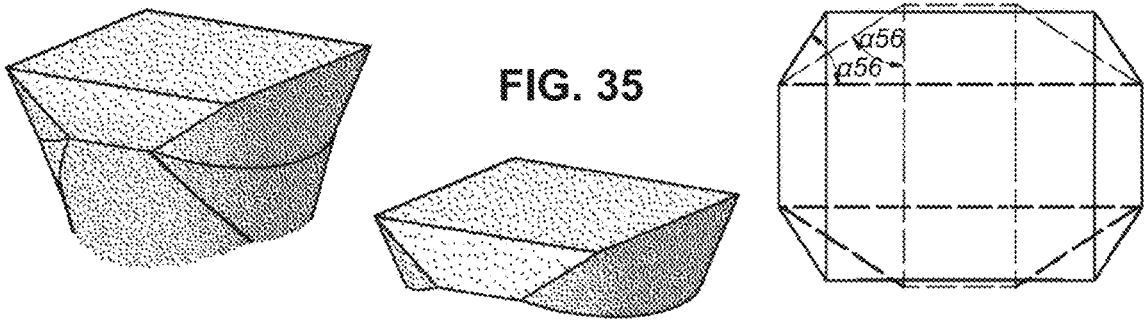
FIG. 35 shows a trimmed flat collapsible closing section appropriate for conical surfaces.
Figure 38:
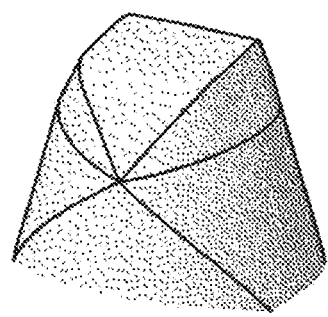
FIG. 38 depicts a very simple filleted flat collapsible closing section appropriate for conical surfaces.
Figure 38:
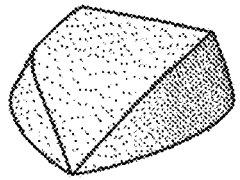
Figure 38:
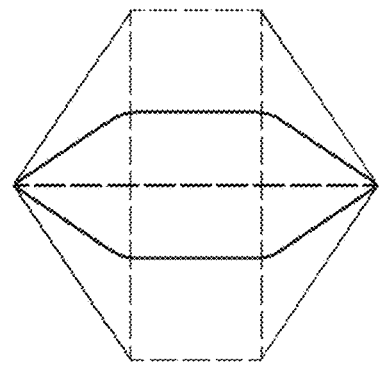
Figure 39:
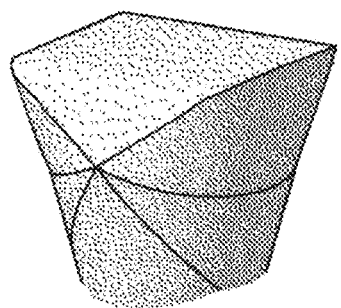
FIG. 39 depicts a very simple filleted flat collapsible closing section appropriate for conical surfaces.
Figure 39:
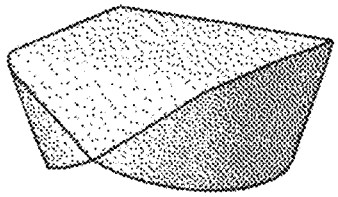
Figure 39:
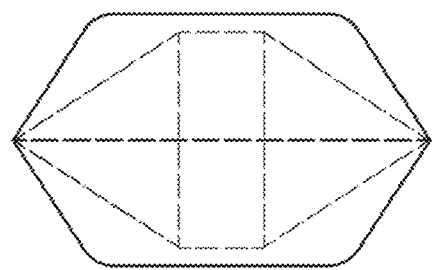
Figure 40:
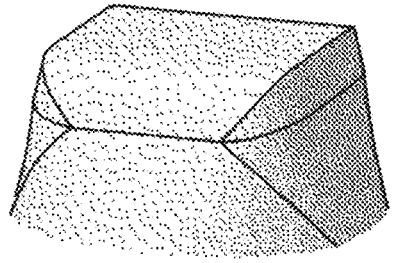
FIG. 40 depicts a trimmed and filleted flat collapsible closing section appropriate for conical surfaces.
Figure 40:
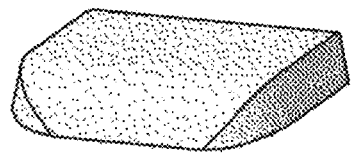
Figure 40:
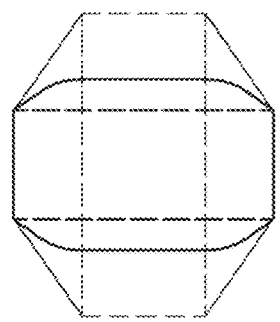
Figure 41:
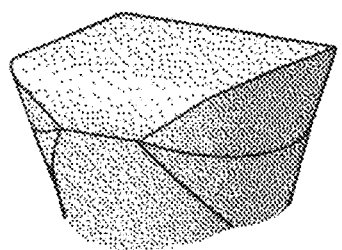
FIG. 41 depicts a trimmed and filleted flat collapsible closing section appropriate for conical surfaces.
Figure 41:
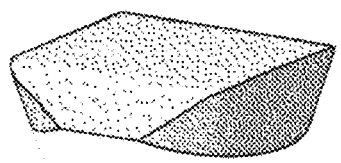
Figure 41:
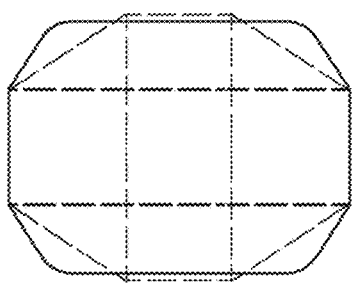

Trimmed modifications of the flat closing sections are possible too (FIG. 33, FIG. 34, FIG. 35). The equality of angles in FIG. 34 and FIG. 35 is shown with α55 and α56.

The flat sections can also be filleted in order to be smoother (FIG. 36, FIG. 37, FIG. 38, FIG. 39, FIG. 40, FIG. 41).

Sharp foldable closing sections for cylindrical and conical sections can be built (FIG. 42 and FIG. 43). They can be constructed using the same auxiliary pairing lines that can be used to build a round closing section for the continuation of the same cylindrical or conical looped surface 256, 257.

Every closing section for cylindrical surfaces described can be mirrored in a foldable structure FIG. 44.

Cylindrical and conical closing sections can also be cut and mirrored by planes FIG. 45, FIG. 46, FIG. 47. These planes can be perpendicular to the planes of symmetry or they can be inclined.

The flat closing sections can be mirrored by a plane that coincides with the flat portion 258 of the closing surface FIG. 48. The flat face can be removed fully or partly if needed FIG. 49. They can be combined with tubular surfaces, cylindrical or conical, depending on the type of the flat closing sections FIG. 50.

Different closing sections or their trimmed modifications can be combined and form foldable structures FIG. 51. The general rule again is that the corresponding outer edges of the two sections that are combined must have equal lengths and same shapes in folded and unfolded position.

Figures 52, 53:
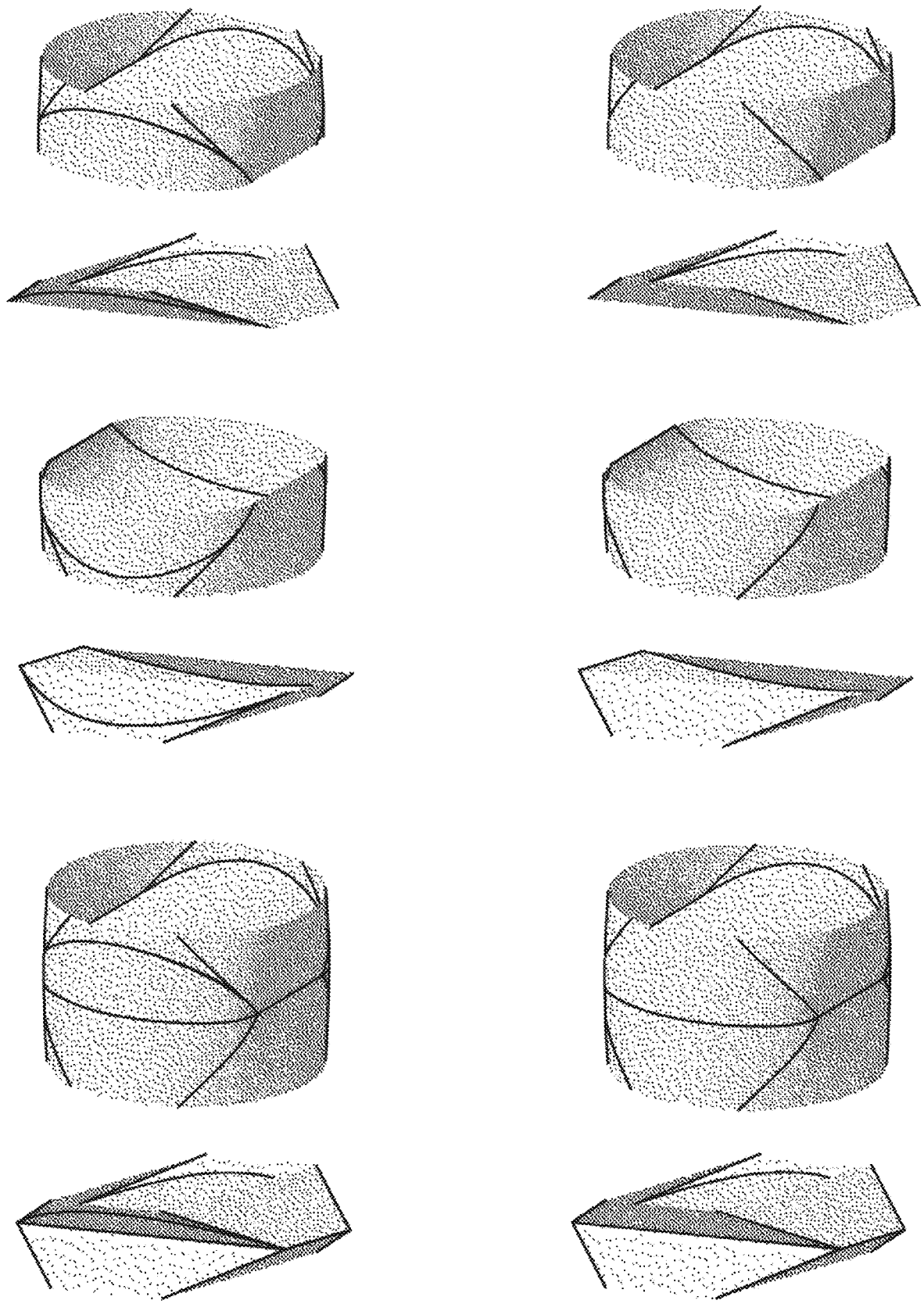
FIG. 52 demonstrates merging of round and sharp cylindrical and conical closing sections with appropriate cylindrical and conical tubular sections.
FIG. 53 demonstrates merging of round and sharp cylindrical and conical closing sections with appropriate cylindrical and conical tubular sections with removed intersecting edges on the tubular surface.

Round and sharp cylindrical and conical closing sections and their cut modifications can be merged with their corresponding cylindrical and conical tubular sections FIG. 52 and FIG. 53.

Combinations of two or more foldable sections can be modified by removing partly or fully faces or by extending them without making the whole structure unstable and without interfering with the folding process (FIG. 54). Such faces can be part of both tubular and closing sections.

This shape of all symmetrical tubular and closing sections and their symmetrical combinations can be stretched as shown in FIG. 55. If they have two planes of symmetry, they can be stretched both directions.

Figure 56:
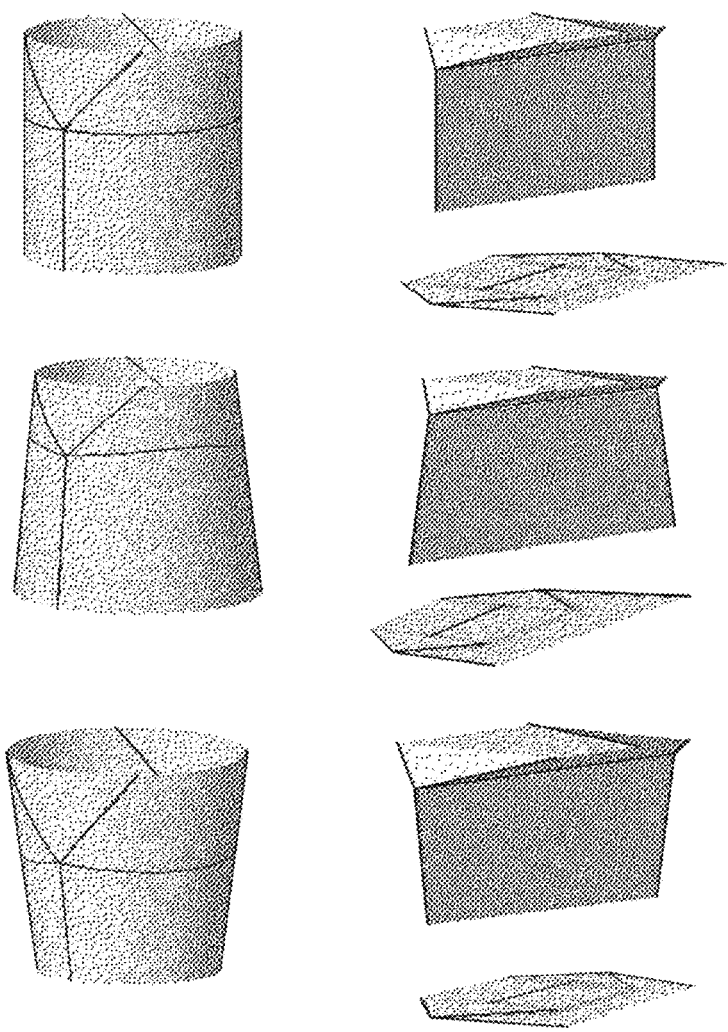
FIG. 56 depicts simple cylindrical and conical sections composed of two faces/segments.

Both, tubular and closing sections, can be combined with a simple type of tubular foldable units as shown in FIG. 56.

Figure 57:
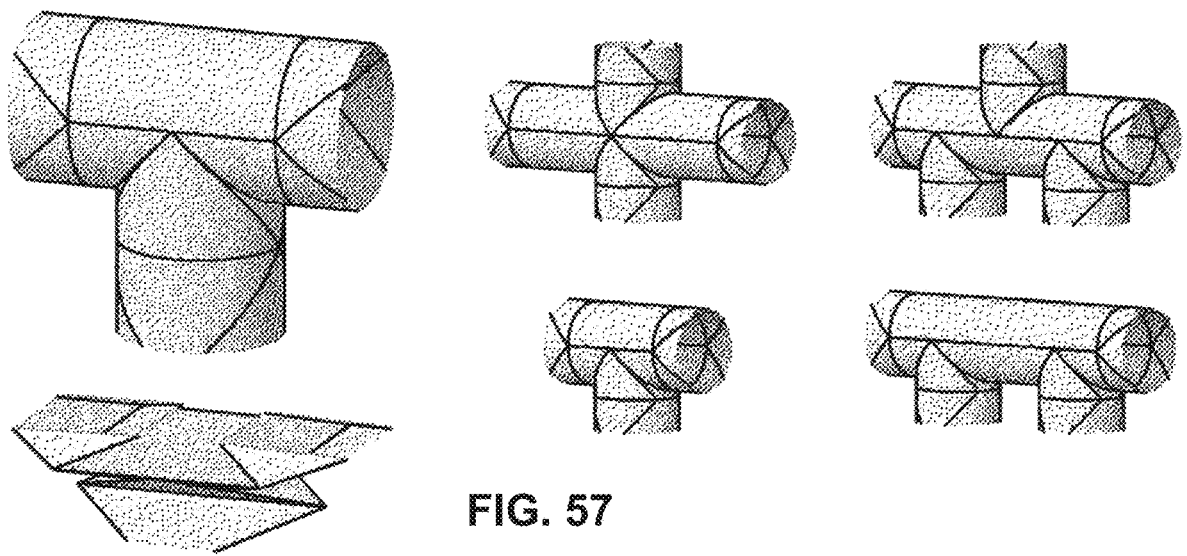
FIG. 57 demonstrates foldable junctions between two or more tubular structures.

A simple folding section from FIG. 56 can be combined with the sharp cylindrical and conical foldable closing sections depicted in FIG. 42 and FIG. 43 and form foldable junctions between two or more tubular structures (FIG. 57). The closing segment of the sharp section can be removed fully or partly and the corresponding portion of the surface of the simple section can also be removed fully or partly in order to connect the spaces inside the tubes.

Figures 58, 59, 60, 61:
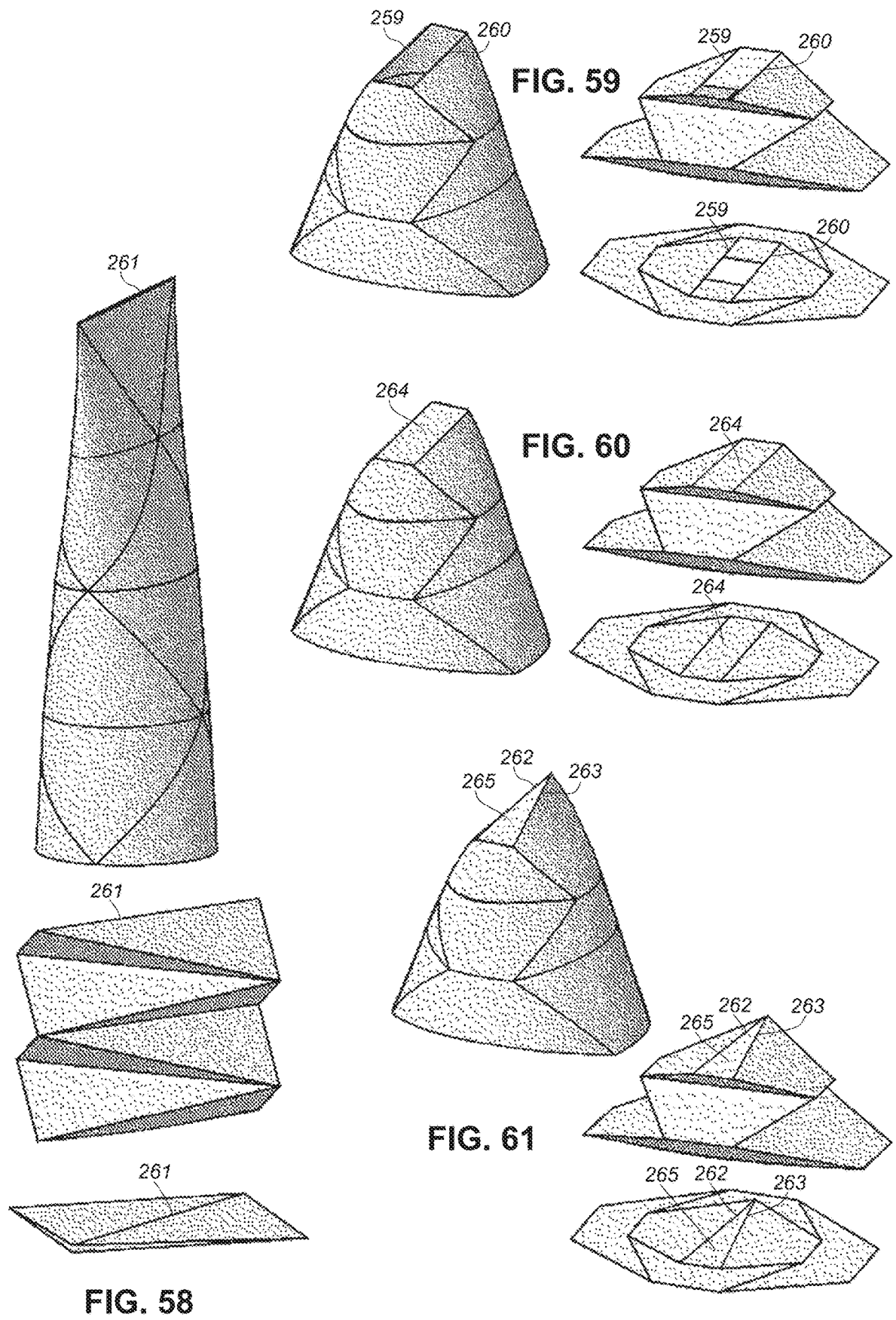
FIG. 58 shows flattening and merging of outer edges of tubular structures.
FIG. 59 shows flattening of outer edges of tubular structures.
FIG. 60 demonstrates closing of flattened outer edges of tubular structures.
FIG. 61 demonstrates closing of flattened outer edges of tubular structures.

Combinations of cylindrical and/or conical tubular sections can be modified by flattening the outer edges 259, 260, 261, 262, 263 as shown in FIG. 58, FIG. 59, FIG. 61.

If the end modules/sections are cut they can be closed fully or partly with additional segments 264, 265 as shown in FIG. 60 and FIG. 61.

Figure 62:
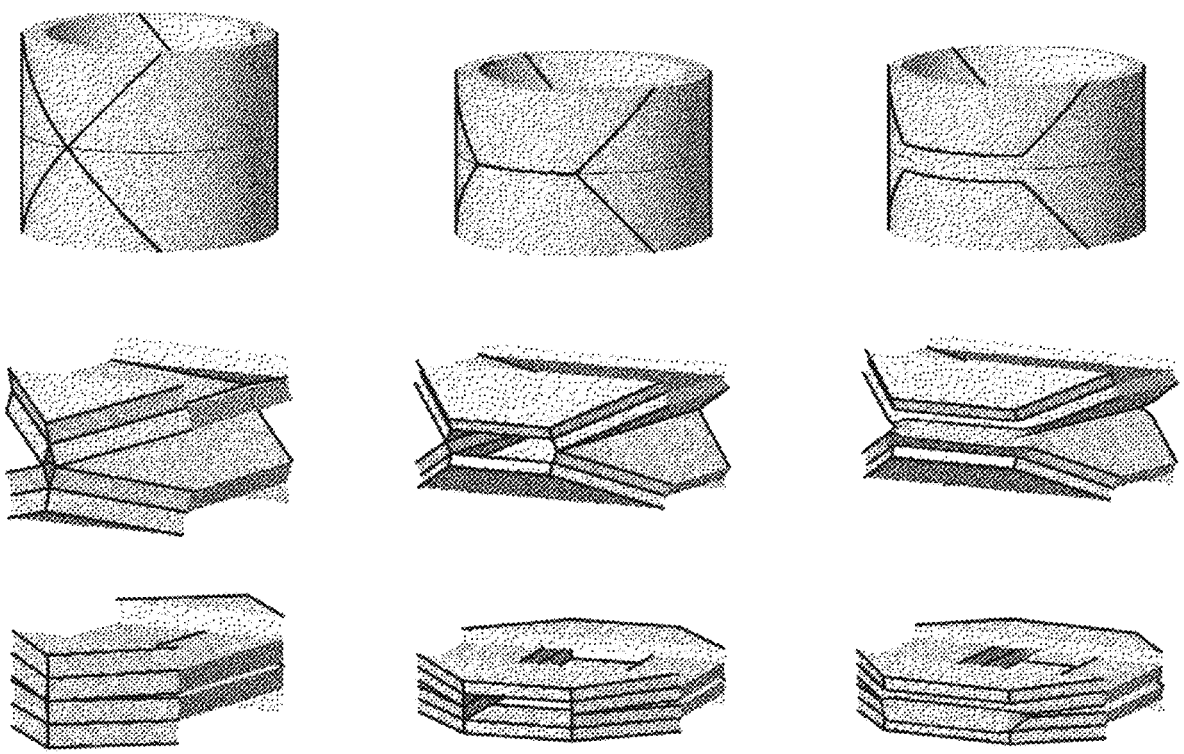
FIG. 62 shows thicker shell modifications of foldable sections.
Figure 63:
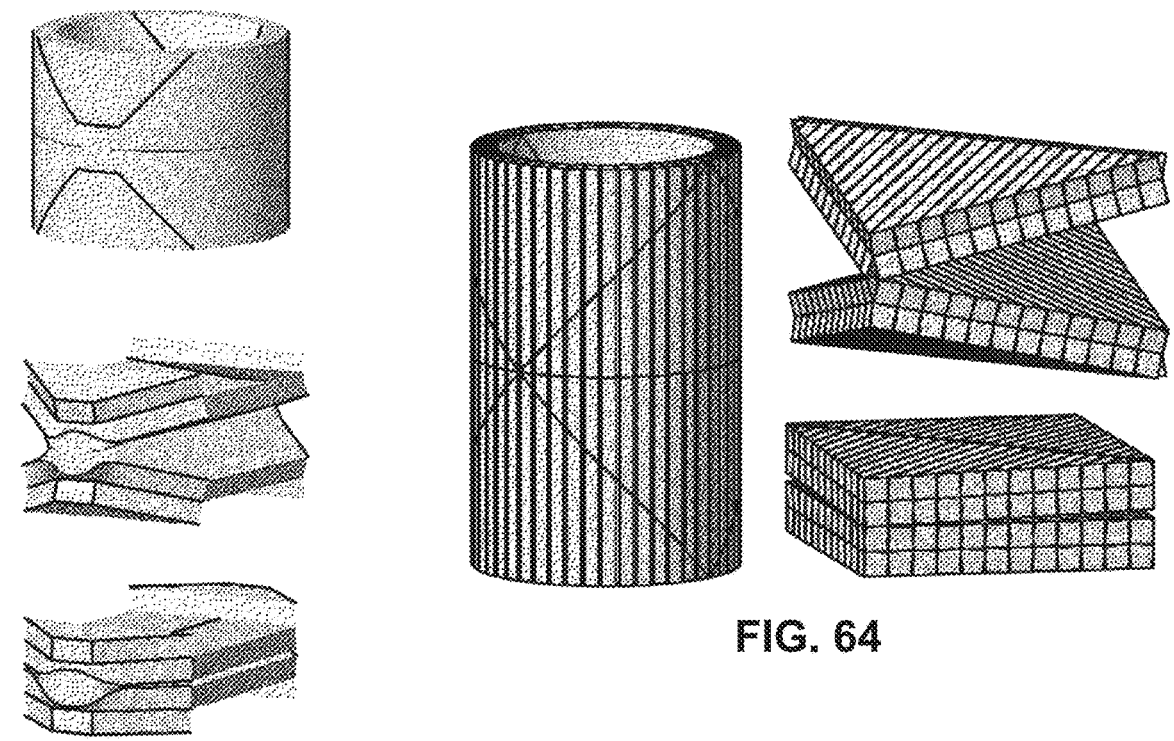
FIG. 63 shows a thicker shell modification of foldable sections.

The shell of the folding sections can be thicker if the material allows enough flexibility (FIG. 62 and FIG. 63).

Figure 64:
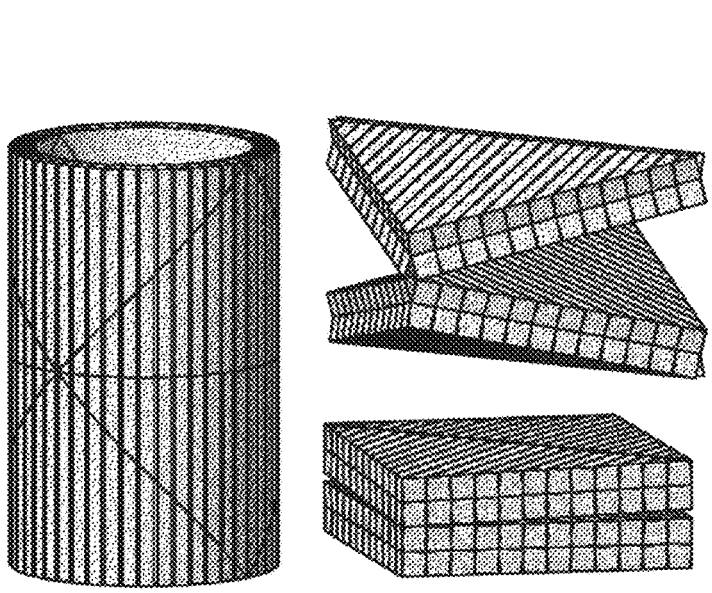
FIG. 64 depicts a rigid material modification of foldable sections.

Using rigid materials is also possible in combinations of two tubular sections if the thick sections are oriented in a way that they do not block the bending of the shell FIG. 64. Additional transverse division of the thick sections or living hinge patterns can also be used to provide bending capabilities to a rigid shell.

Figure 65:
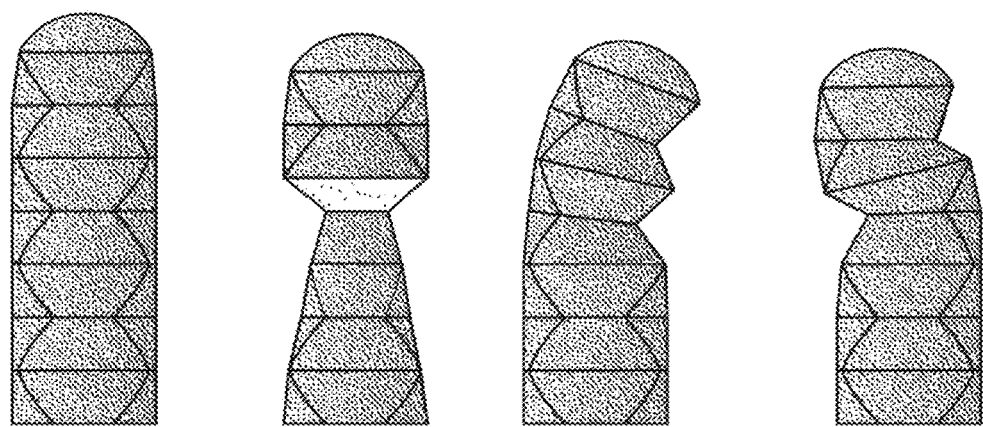
FIG. 65 shows partly folded states of structures composed of foldable sections.

Structures composed of cylindrical and conical collapsible sections can function in partly folded states (FIG. 65) giving either symmetrical or asymmetrical solutions. This also can provide interactivity to the articles they are used for by giving the option to sculpture them.

Figure 66:
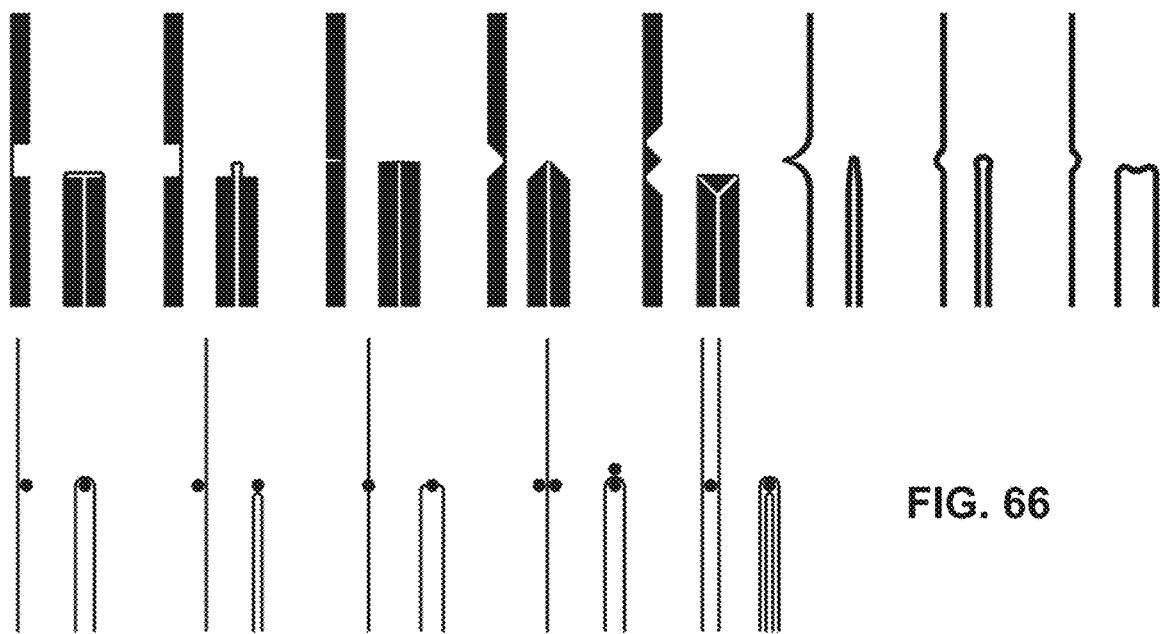
FIG. 66 demonstrates possible geometry of folding edges/hinges.

Examples of possible geometry of the folding edges/hinges are shown in FIG. 66. They can be achieved by either making the edges more flexible than the surface material or by making them stiffer than it but flexible enough at the zones of intersection.

The edges/hinges can be made of the same material as the surface or they can be made of a different one. If the materials used for the edges/hinges have enough elasticity and the materials used for the surface offer enough flexibility structures composed of combinations of the foldable sections disclosed can also be self-deployable or self-folding depending on which is the natural state of its elements.

The edges/hinges can be continuous or broken into sections leaving bridges connecting the surface segments. The flexibility of the edges/hinges can also be achieved by making sequences of holes along them. Some edges can even be fully cut to serve as openings when appropriate.

The geometry of the edges or their sections that do not serve as hinges can be modified if the achieved modification does not interfere undesirably with the folding process.

Openings can be placed on the surface elements and even over the edges/hinges.

Figure 67:
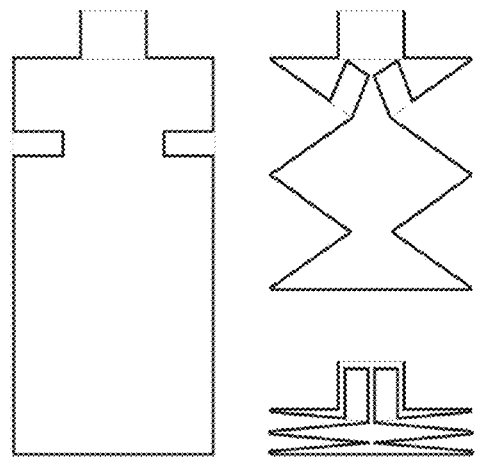
FIG. 67 depicts modified foldable sections that fill cavities in the folded structure.
Figure 68:
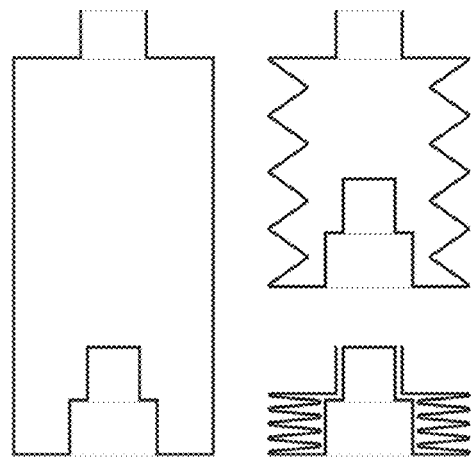
FIG. 68 depicts modified foldable sections that fill cavities in the folded structure.
Figure 69:
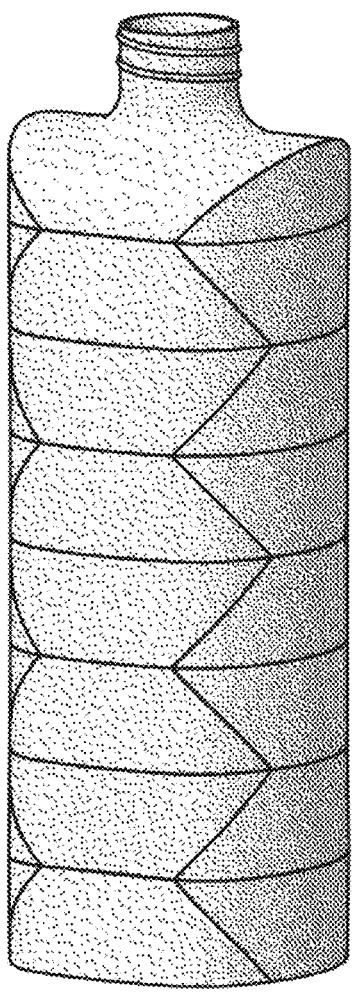
FIG. 69 depicts a collapsible container composed of foldable sections.
Figure 70:
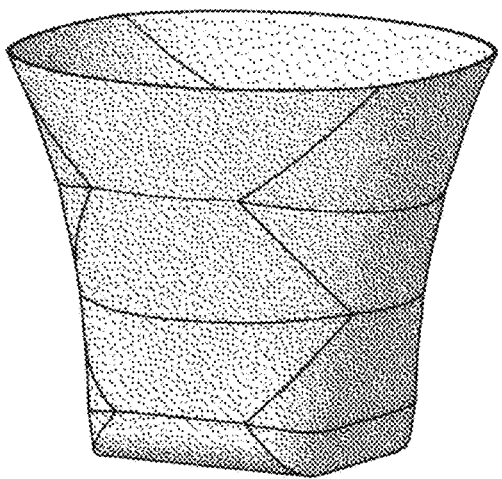
FIG. 70 depicts a collapsible container composed of foldable sections.
Figure 71:
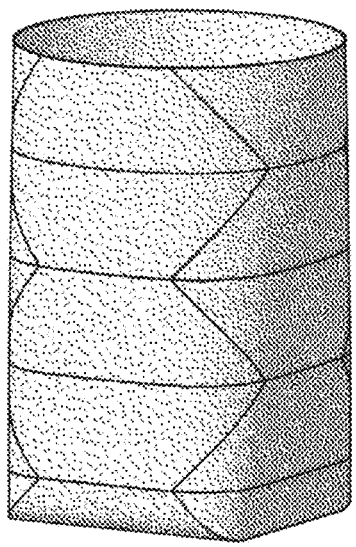
FIG. 71 depicts a collapsible container composed of foldable sections.
Figure 72:
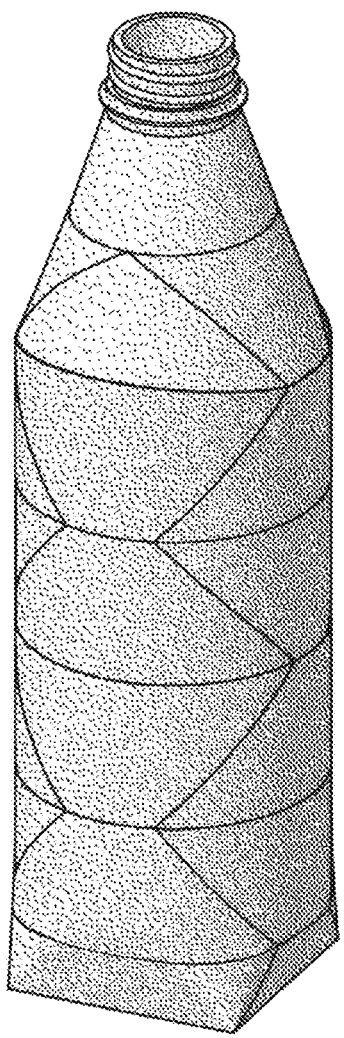
FIG. 72 depicts a collapsible container composed of foldable sections.
Figure 73:
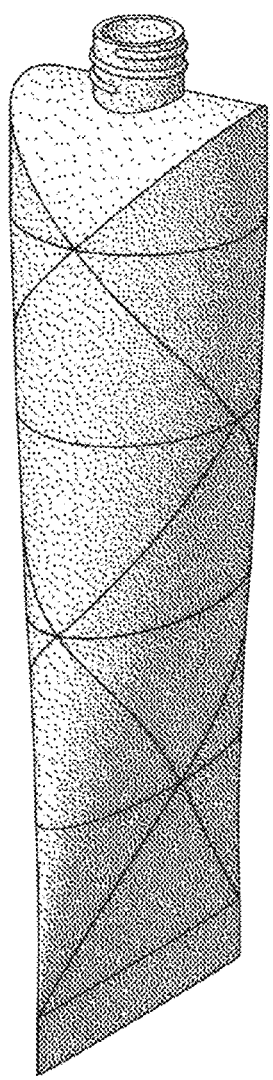
FIG. 73 depicts a collapsible container composed of foldable sections.
Figure 74:
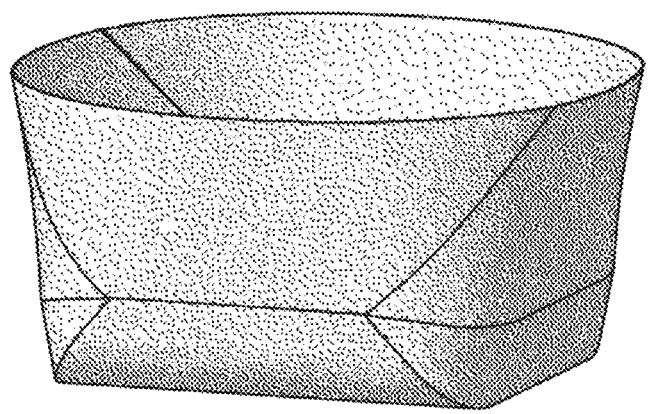
FIG. 74 depicts a collapsible container composed of foldable sections.
Figure 75:
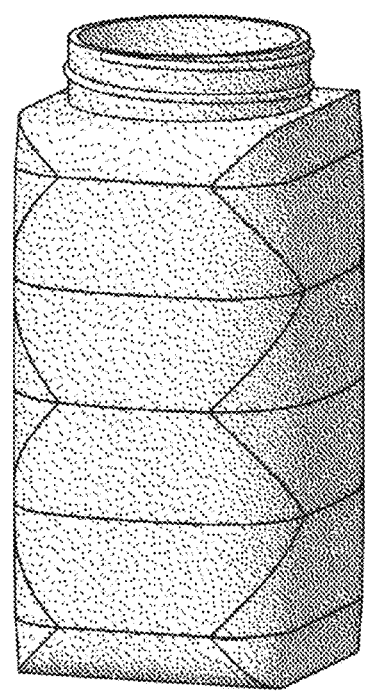
FIG. 75 depicts a collapsible container composed of foldable sections.
Figure 76:
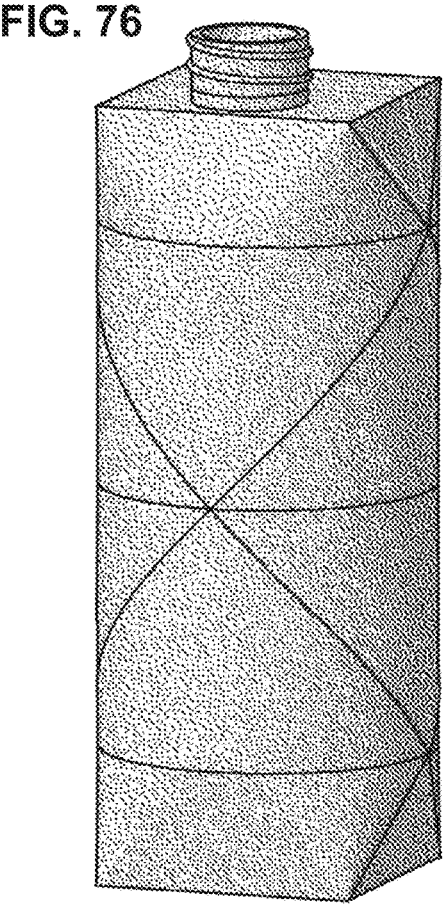
FIG. 76 depicts a collapsible container composed of foldable sections.
Figure 77:
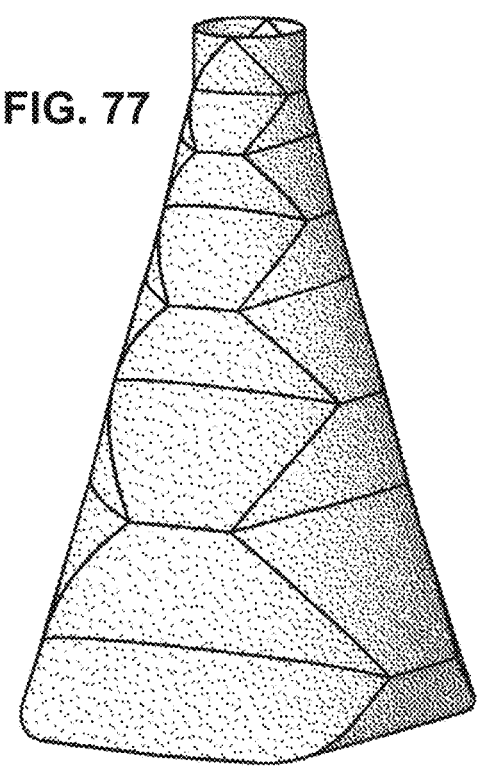
FIG. 77 depicts a collapsible container composed of foldable sections.

The shape of the surface elements can be modified in order to follow the shape of another element in folded position, for example, when in folded position a container is needed to be completely empty (FIG. 67 and FIG. 68).

Combinations of foldable sections can be made of one material or by multiple materials for the different sections or parts of them.

Examples of possible material options for the sections or parts of them can be: plastic, rubber, silicone, paper, cardboard, leather, fabric, foam materials, metal, and any other appropriate type of material. A wide range of production techniques can be used: moulding, casting, thermoforming, vacuum forming, rolling sheet materials, welding, gluing, sewing, and any other appropriate method.

They can be manufactured in unfolded, folded, and partly or semi-folded states.

The foldable structures can be used not only for articles that are designed to be used multiple times but also for articles that are designed to be used just once, making their disposal, storage, packaging, and transportation more effective or even making them reusable.

The combinations of foldable sections described can be used not only for fully collapsible articles but also for parts and portions of articles. They can also combine with other appropriate folding patterns.

The cross sections of the cylindrical and conical sections are not required to be symmetrical curves.

They can be asymmetrical and even have abrupt bends if these bends coincide with the internal edges/hinges in a section. They can also have straight sections. The main requirement is to have the appropriate circumferences for the particular sections. Their shape can also vary along the tube if the required length of the sections does not change significantly and the resulting surface is developable or a close enough approximation of a developable surface.

The surface elements are not required to be fully developable surfaces. They can be deformed in order to have double curvature especially when more smooth shape is needed but not maximum contraction is required. They can also be divided by adding extra edges/hinges if needed.

Approximations of the shape of the surface elements and the edges/hinges are also acceptable, depending on the desired qualities of the article.

Figure 79:
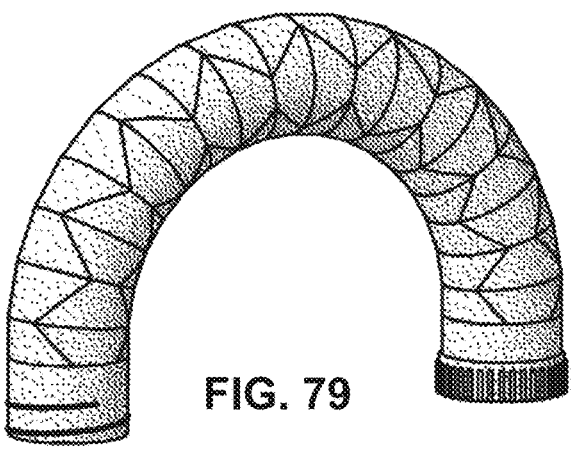
FIG. 79 shows a collapsible pipe structure composed of foldable sections.
Figure 78:
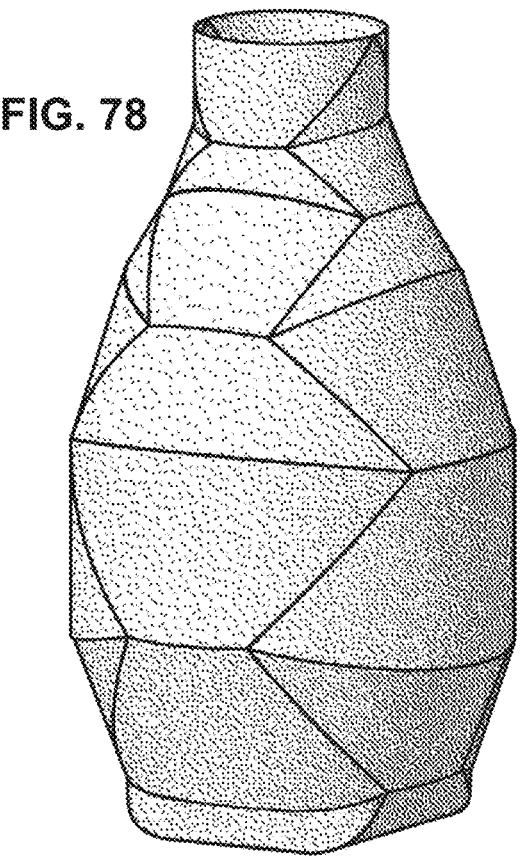
FIG. 78 depicts a collapsible container composed of foldable sections.
Figure 80:
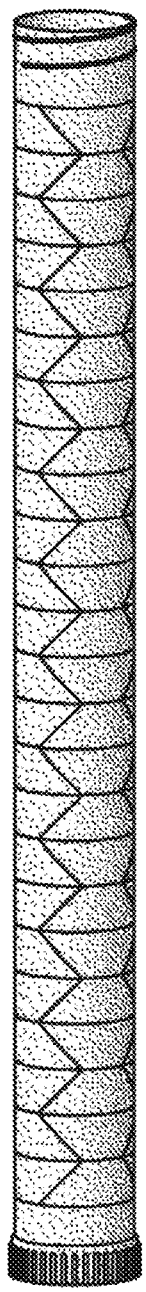
FIG. 80 shows a collapsible pipe structure composed of foldable sections.

Some examples of collapsible containers designed by using combinations of the foldable sections presented are shown from FIG. 69 to FIG. 78. Examples of foldable pipe structures are shown in FIG. 79 and FIG. 80.

Alternative applications are also possible. Foldable structures composed of the described sections can be used as pumps, syringes, and cookie presses. The fact that they are interactive and can provide different shapes in folded and partly folded states makes them appropriate for toys and modular construction games. Foldable coverage or insulation for pipes and containers can also be an alternative application. Other applications can be packaging, funnels, straws, dust and powder puffers, inflatable structures, bags, clothes, lampshades, collapsible furniture and shelter structures and parts for them. Different applications can be even combined in one task unification article. Even the qualities of objects made of rigid and solid materials are possible if a closed unfolded shell is filled with a fluid or a powder-like substance in order to block the folding process which can make it appropriate for handles, sticks, rolling pins and other appropriate articles.

What is claimed is:

1. A collapsible article comprising:
a plurality of foldably interconnected foldable sections, at least two of said sections are looped to define a substantially cylindrical or conical outer surface of a portion of the article and each of the at least two sections consist of four curved segments interconnected by foldable edges, wherein
in a non-collapsed state, each of the at least two foldable sections is completely deployed and the four interconnected curved segments form the substantially cylindrical or conical outer surface,
in a collapsed state, each of the at least two foldable sections is collapsed and each of the four curved segments is polygonal in shape and form substantially flat surfaces that are at least partially superimposed and substantially parallel to each other, and remain interconnected by said foldable edges; and foldable edges connecting the plurality of foldable sections.

2. A collapsible article comprising:
a plurality of foldably interconnected foldable sections, at least one of said sections is looped to define a substantially cylindrical or conical outer surface of a portion of the article and said at least one section consists of four curved segments interconnected by foldable edges, wherein
in a non-collapsed state, the at least one foldable section is completely deployed and the four interconnected curved segments form the substantially cylindrical or conical outer surface,
in a collapsed state, the at least one foldable section is collapsed and at least two of the four curved segments are triangular in shape and form substantially flat surfaces that are at least partially superimposed and substantially parallel to each other, and remain interconnected by said foldable edges; and foldable edges connecting the plurality of foldable sections.

3. The article of claim 2, wherein all of said segments are triangular in shape.

4. The article of claim 2, wherein at least two of said segments are isosceles triangular in shape.

5. A collapsible article comprising:
a plurality of foldably interconnected foldable sections, at least one of said sections is looped to define a substantially cylindrical or conical outer surface of a portion of the article and consists of four curved segments interconnected by foldable edges, wherein
in a non-collapsed state, the at least one foldable section is completely deployed and the four interconnected curved segments form the substantially cylindrical or conical outer surface,
in a collapsed state, the at least one foldable section is collapsed and each of the four curved segments is polygonal in shape and form substantially flat surfaces that are at least partially superimposed and substantially parallel to each other, and remain interconnected by said foldable edges; and foldable edges connecting the plurality of foldable sections, and wherein, in a non-collapsed state, at least one of said sections includes three curved segments that fully or partly close said article.

6. A collapsible article comprising:

a plurality of foldably interconnected foldable sections, at least one of said sections is looped to define a substantially cylindrical or conical outer surface of a portion of the article and consists of four curved segments interconnected by foldable edges, wherein in a non-collapsed state, the at least one foldable section is completely deployed and the four interconnected curved segments form the substantially cylindrical or conical outer surface, in a collapsed state, the at least one foldable section is collapsed and each of the four curved segments is polygonal in shape and form substantially flat surfaces that are at least partially superimposed and substantially parallel to each other, and remain interconnected by said foldable edges; and foldable edges connecting the plurality of foldable sections, and wherein, in a non-collapsed state, at least one of said sections includes five segments that fully or partly close said article.

* * * * *